(12) United States Patent
Kakumoto et al.

(10) Patent No.: US 7,839,442 B2
(45) Date of Patent: Nov. 23, 2010

(54) SOLID-STATE IMAGE SENSING DEVICE INCLUDING RESET CIRCUITRY AND IMAGE SENSING DEVICE INCLUDING THE SOLID-STATE IMAGE SENSING DEVICE AND METHOD FOR OPERATING THE SAME

(75) Inventors: Tomokazu Kakumoto, Nagaokakyo (JP); So Yano, Ibaraki (JP); Masayuki Kusuda, Nishinomiya (JP); Kazuchika Sato, Kobe (JP); Yoshihiro Tanaka, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1278 days.

(21) Appl. No.: 11/236,388

(22) Filed: Sep. 27, 2005

(65) Prior Publication Data

US 2006/0072025 A1 Apr. 6, 2006

(30) Foreign Application Priority Data

Oct. 5, 2004 (JP) .............................. 2004-292175

(51) Int. Cl.
H04N 3/14 (2006.01)
(52) U.S. Cl. ...................................... 348/308
(58) Field of Classification Search ........................ None
See application file for complete search history.

(56) References Cited

U.S. PATENT DOCUMENTS 6,008,486 A * 12/1999 Stam et al. ............... 250/208.1
6,831,264 B2 * 12/2004 Cazaux ................... 250/214 R
7,221,396 B2 * 5/2007 Lenz ......................... 348/297

FOREIGN PATENT DOCUMENTS

| JP | 3-192764 A | 8/1991 |
| JP | 2001-94878 A | 4/2001 |
| JP | 2003-163841 A | 6/2003 |

* cited by examiner

*Primary Examiner*—Justin P Misleh
(74) *Attorney, Agent, or Firm*—Sidley Austin LLP

(57) ABSTRACT

An object of the present invention is to provide a solid-state image sensing device configured to change a bias voltage given to the photoelectric converting section at the time of resetting so that an operative condition of the photoelectric converting section after the resetting can be maintained a constant condition regardless of an amount of the incident light. To achieve the object, an MOS transistor T5 is provided. The drain of the MOS transistor T5 is connected with a gate and a drain of an MOS transistor T2 and the source of the MOS transistor T5configured to be applied a DC voltage VRS. Here, a signal Φ V is given, an MOS transistor T4is turned on, and image data is output. A signal Φ RS is given and the MOS transistor T5 is turned on. As a result, a gate voltage Vg of the MOS transistor T2 is maintained as a constant voltage value. Then, a reset operation for pixels is stared.

15 Claims, 18 Drawing Sheets

SOLID-STATE IMAGE SENSING DEVICE INCLUDING RESET CIRCUITRY AND IMAGE SENSING DEVICE INCLUDING THE SOLID-STATE IMAGE SENSING DEVICE AND METHOD FOR OPERATING THE SAME

This application is based on application No. JP 2004-292175 filed in Japan, the contents of which is hereby incorporated by reference.

BACKGROUND OF THE INVENTION

1. Field of the Invention

The present invention relates to an improved image sensing device. More particularly, the present invention relates to a solid-state image sensing device. In more detail, the present invention relates to an improved solid-state image sensing device having a photoelectric converting element for outputting an electric signal according to an amount of incident light, and an image sensing device including the solid-state image sensing device.

2. Description of the Related Art

A solid-state image sensing device is small, light weight, and of low-power consumption. Moreover, image distortion and burning may not occur in the device, and the device is capable of dealing with environmental conditions such as vibration and magnetic field. Further, since the device can be manufactured by the step which is common with or similar to that of LSI (Large Scale Integrated Circuit), its reliability is high and it is suitable to mass production. For these reasons, solid-state image sensing devices where pixels are arranged linearly is used widely for facsimile machines and flat bed scanners, and solid-state image sensing devices where pixels are arranged in a matrix patterns is widely used for video cameras and digital cameras. Such solid-state image sensing devices are roughly classified into CCD type and MOS type devices according to means for reading (taking out) photoelectric charges generated from a photoelectric converting element. A CCD type device stores photoelectric charges in a potential well and simultaneously transmits them, thus arising a disadvantage that a dynamic range is narrow. On the other hand, an MOS type device reads electric charges stored in a pn junction capacitance of a photodiode via an MOS transistor.

As a technique for widening a dynamic range of an MOS type solid-state image sensing device, the assignee of this patent application proposed a solid-state image sensing device which includes photocurrent generating means for generating a photocurrent according to an amount of incident light, an MOS transistor for inputting a photocurrent, and bias means for biasing the MOS transistor so that a sub-threshold current flows in the MOS transistor. In this device, a photocurrent is logarithmically converted (See Japanese Patent Laid-Open Publication No. H3-192764). Although such a solid-state image sensing device has a wide dynamic range, threshold properties of the MOS transistors provided for respective pixels are different from one another, thereby occasionally making sensitivity different per pixel. Therefore, it is necessary to hold an output obtained by previously emitting a bright light (uniform light) with uniform brightness as correcting data for correcting outputs of respective pixels at the time of taking an image of an object.

However, there arise problems such that it is complicated for an operator to irradiate the respective pixels using an external light source and exposure cannot be executed uniformly and effectively. Moreover, when a uniform light emitting mechanism is provided to an image sensing device, there arises a problem that the structure of the image sensing device becomes complicated. Therefore, as a technique to solve the problems, the assignee of this application proposed a solid-state image sensing device which is capable of counteracting sensitivity unevenness of each pixel without previously emitting an uniform light (See Japanese patent Laid-Open Publication No. 2001-094878).

According to a solid-state image sensing device with the structure described above, a switch is provided between a photodiode for performing a photoelectric converting operation and an MOS transistor configured to operate in a sub-threshold region. At the time of resetting, the switch electrically disconnects the photodiode and the MOS transistor, and a signal is output. The sensitivity unevenness of each pixel can be countered by using the signal, which is output at the time of resetting, as correcting data to counteract the sensitivity unevenness of each pixel. However, with such operation, when the switch connects them after a reset operation is finished, electric charges remain at a connecting part between the photodiode and the MOS transistor. As a result, since an image sensing operation is performed in the condition that the electric charges are remained, an after-image phenomenon occurs.

Further, to prevent the occurrence of the after-image phenomenon, the assignee of this application proposed a solid-state image sensing device configured to perform another reset operation on electric charges remained at the connecting node between a photodiode and an MOS transistor via the MOS transistor, after the MOS transistor is connected with the photodiode and a reset operation is finished (See Japanese patent Laid-Open Publication No. 2003-163841).

A structure of a pixel provided to the solid-state image sensing device is shown in FIG. 17. In accordance with the pixel in FIG. 17, a pn photodiode PD forms a photosensitive section (photoelectric converting section). A cathode of the photodiode PD is connected with a drain of an MOS transistor T1. A source of the MOS transistor T1 is connected with a drain and a gate of an MOS transistor T2 and a gate of an MOS transistor T3. A source of the MOS transistor T3 is connected with a drain of an MOS transistor T4 which is adapted to select lines. A source of the MOS transistor T4 is connected with an output signal line 16. Here, the respective MOS transistors T1 to T4 are P-channel MOS transistors.

A DC voltage VPD is applied to an anode of the photodiode PD and a drain of the MOS transistor T3. On the other hand, a signal φVPS is input to a source of the MOS transistor T2. The signal φVPS is switched among three voltage values VH, VM and VL (VL<VM<VH). Moreover, a signal φS is input to a gate of the MOS transistor T1, and a signal φV is input to a gate of the MOS transistor T4.

To the pixels with such structure, respective signals are provided according to a timing chart shown in FIG. 18A. That is, the signal φS is brought into low level and the MOS transistor T1 is turned on while the voltage of the signal φVPS is turn to VL. Then an image sensing operation is started. As the signal φVPS is brought into VL in this way, the MOS transistor T2 begins to operate in a sub-threshold region only after the gate voltage reaches a predetermined value. Therefore, a linearly converted electric signal is output when a brightness value of an object is lower than the predetermined value and a logarithmically converted electric signal is output when the brightness value of the object is equal to or higher than the predetermined value. At Time ta1, a pulse signal φV in low level is provided and the MOS transistor T4 is turned on. As a result, a signal during the image sensing operation is output to the output signal line as image data.

After the pulse signal φV is brought into high level, at Time ta2, the signal φ S is brought into high level and the MOS transistor T1 is turned off to stop the image sensing operation. At Time ta3, the voltage of the signal φ VPS is brought into VH and a bias voltage to be given to the MOS transistor T2 is made to be higher than the bias voltage used during the image sensing operation to start resetting. As a result, as shown in FIG. 18B, the gate voltage Vg of the MOS transistor T2 reduces by Time ta2 according to the brightness of the object. That is, with higher brightness of the object, the gate voltage Vg becomes lower. As a reset operation starts at Time ta3, it begins to change so that the gate voltage Vg becomes high.

At Time ta4, a pulse signal φ V in low level is given, and a signal reflecting a threshold voltage of the MOS transistor T2 is output to the output signal line. This signal represents a sensitivity unevenness among the pixels and used as correcting data to correct the sensitivity unevenness. At Time ta5, the signal φ VPS is brought into VL and the signal φ V is brought into high level. At Time ta6, the signal φ S is brought into low level and the MOS transistor T1 is turned on. As a result, at Time ta6, the photodiode PD and the MOS transistor T2 are electrically connected to each other. With electric charges remained at the photodiode PD, the gate voltage Vg of the MOS transistor T2 reduces as shown in FIG. 18B, and an after-image phenomenon occurs.

At Time ta7, by setting the signal φ VPS as VM temporarily, the MOS transistor T2 is temporarily set to be conductive in the condition that the photodiode PD and the MOS transistor T2 are connected via the MOS transistor T1. With such structure, the electric charges, a cause of an after-image, remained at the connecting part between the cathode of the photodiode PD and the gate and drain of the MOS transistor T2 is discharged, and, as shown in FIG. 18B, the gate voltage Vg of the MOS transistor T2 becomes high. At Time ta8, the signal φ VPS is brought into VL and the image sensing operation is started.

As described above, a pixel having a structure illustrated in FIG. 17 is adapted to operate as shown in FIG. 18A so that the gate voltage Vg of the MOS transistor T2 changes as shown in FIG. 18B. Here, at the time of bringing the voltage of the signal φ VPS into VH to start a reset operation of the MOS transistor T2 at Time ta3, the gate voltage Vg of the MOS transistor T2 varies according to a brightness value of an object. Unevenness of the gate voltage Vg at the time of starting the reset operation (Time ta3) in accordance with the brightness value of the object causes unevenness of the voltage values of gate voltage Vg at respective Times ta6 to ta8. Therefore, the voltage just before starting the image sensing operation (Time ta8) varies in the respective pixels having different brightness values of the image sensed object.

FIG. 19 shows a typical example of a relation of a sensor surface illuminance (brightness value) X and output Y in a solid-state image sensing device including a pixel having a structure illustrated in FIG. 17. FIG. 19 magnifies and shows a low brightness region where the output Y of the solid-state image sensing device linearly changes according to an amount of incident light, and the sensor surface illuminance, the horizontal axis, is illustrated in liner scale. In FIG. 19, the output Y of the solid-state image sensing device represents the values after the sensitivity unevenness is corrected with the correcting data. Further, in FIG. 19, the continuous line represents a preferable photoelectric converting property (photoelectric converting property in which the relation of X and Y is $Y=X^{1.0}$) based on values in which the output Y becomes a value proportional to the sensor surface illuminance (brightness value), and the dashed line represents a photoelectric converting property based on actual measured values of the output Y.

The actual photoelectric converting property illustrated with the dashed line in FIG. 19 is a property illustrated as a curved line representing a relation of $Y=X^{0.65}$. Within a region where the solid-state image sensing device performs a linear converting operation, the actual measured value of the output Y becomes lower than the preferable value as the sensor surface illuminance (brightness value) becomes higher. As a result, an occurrence of an internal loss in the solid-state image sensing device is found. The reason for this seems that, in the low brightness region where linearly converted values are output, the gate voltage Vg of the MOS transistor T2 just before starting the image sensing operation (Time ta8) is higher than the gate voltage Vg of the MOS transistor T2 at the time of finishing a reset operation by turning off the MOS transistor T1 (Time ta6).

In other words, when the voltage of the signal φ VPS is brought into VM in order to prevent the after-image phenomenon, the voltage value VM is kept constant and not related to the brightness value, and the period of time to maintain the voltage value as VM is also kept constant. Therefore, when the signal φ VPS is brought into VM, a substantial change may occur depending on the brightness value of the image sensed object and the above internal loss may occur.

OBJECTS AND SUMMARY

In view of such problems, it is an object of the present invention to provide an improved solid-state image sensing device. More particularly, it is an object of the present invention to provide a solid-state image sensing device for maintaining a constant operative condition in a photoelectric converting section after a reset operation, regardless of an amount of incident light, by changing a bias voltage to be given to the photoelectric converting section at a reset operation.

To achieve the above described object and other objects, a solid-state image sensing device reflecting one aspect of the present invention has a pixel including a photoelectric converting element for producing an electric signal according to an amount of light projected thereto, a first transistor for connecting with the photoelectric converting element and generating an electric signal according to a photoelectric charge from the photoelectric converting element, and an output unit for outputting the electric signal from the first transistor. The pixel includes a reset voltage supplying unit for supplying a predetermined voltage to a connecting part between the photoelectric converting element and the first transistor in a predetermined timing at a time of resetting.

In such image sensing device, the reset voltage supplying unit includes a first electrode configured to be applied a predetermined voltage and a second electrode configured to be connected with the connecting part between the photoelectric converting element and the first transistor. The reset voltage supplying unit is a second transistor for being turned on and off in the predetermined timing.

In another aspect, the predetermined timing may be after an image data reading operation in which an electric data to be used as screen image data obtained by an image sensing operation performed by the photoelectric converting element and the first transistor is out put to the out put circuit, and the predetermined voltage may be a voltage value which is produced at the connection part between the photoelectric converting element and the first transistor when light having a higher brightness value than a photographable brightness range is emitted to the photoelectric converting element.

In another aspect, the pixel may include a switch for electrically connecting and disconnecting the photoelectric converting element and the first transistor. When the pixel performs an image sensing operation, the switch may be turned on to connect the photoelectric converting element and the first transistor. When the pixel performs a reset operation, the switch may be turned off to disconnect the photoelectric converting element and the first transistor to reset an operative condition of the first transistor, and subsequently the switch may be turned on to connect the photoelectric converting element and the first transistor to reset a remained electric charge in the photoelectric converting element.

Here, the predetermined timing may be just before resetting the remained electric charge in the photoelectric converting element. The predetermined voltage may be a voltage value which is produced at the connection part between the photoelectric converting element and the first transistor according to the remained electric charge produced in the photoelectric converting element when light having a higher brightness value than a photographable brightness range is emitted to the photoelectric converting element.

In the above mentioned solid-state image sensing device, for example, when the photoelectric converting element is connected with the second electrode and a control electrode of the first transistor, the second electrode of the second transistor may be connected with the second electrode and the control electrode of the first transistor. Here, the pixel may include an amplifying transistor configured to be connected with the second electrode and control electrode of the first transistor, to amplify a photoelectrically converted electric signal, and to output the signal via the second electrode. Further, the pixel may include a selecting transistor configured to have a first electrode connected with the second electrode of the amplifying transistor and a second electrode connected with the output signal line.

The plurality of pixels may be arranged in a matrix pattern. The pixels may include an integrating circuit for integrating an electric signal from a photoelectric converting circuit composed of the photoelectric converting element and the first transistor. The pixels may include a simultaneous integrating function by providing a switch for electrically connecting and disconnecting the photoelectric converting circuit composed of the photoelectric converting element and the first transistor and an output circuit. A photoelectric converting section composed of the photoelectric converting element and the first transistor may output the electric signal logarithmically converted according to an amount of incident light. The photoelectric converting section may output the electric signal linearly converted according to an amount of incident light while the amount of incident light is lower than a predetermined value, and may output the electric signal logarithmically converted according to the amount of incident light while the amount of incident light is equal to or higher than a predetermined value.

An image sensing device in another aspect of the present invention includes a solid-state image sensing device for outputting an electric signal obtained in an image sensing operation as an image data and outputting an electric signal obtained after a reset operation as a correcting data, and a subtracter for outputting a value obtained by subtracting the image data and the correcting data from the solid-state image sensing device. This solid-state image sensing device is one of the solid-state image sensing devices described above.

The image sensing device includes a solid-state image sensing device for outputting an electric signal obtained in an image sensing operation as image data and outputting an electric signal obtained after resetting as correcting data, a subtracter for outputting image signal obtained by subtracting the image data and the correcting data from the solid-state image sensing device, and a signal processing unit for performing signal processing on the electric signal from the subtracter. The solid-state image sensing device is one of the solid-state image sensing devices described above. A comparator is provided to compare the correcting data output from the solid-state image sensing device with a reference value, and a determining unit is provided to determine whether or not to select the image signal from the subtracter as an image data for signal processing according to a comparison result in the comparator.

In a case that the determining unit confirms a value of the correcting data is in a brightness range which is substantially changed from a brightness value according to the comparison result in the comparator, not an image signal from the subtracter but an image signal set in a value based on a highest brightness value is selected as an image signal for the signal processing. The determining unit is provided in an image processing unit in a third embodiment.

In another aspect, a memory may be provided for previously storing the correcting data. In a case that the determining unit confirms a value of the correcting data is in a brightness range which is substantially changed from a brightness value according to the comparison result in the comparator, not an image signal from the subtracter but an image signal obtained by subtracting the image data output from the solid-state image sensing device and the correcting data stored in the memory may be selected as an image signal for the signal processing.

Here, the correcting data stored in the memory may be correcting data stored in a condition that the value of the correcting data is in a brightness range which is approximately constant to brightness value according to the comparison result in the comparator.

In accordance with the present invention, a bias voltage in the photoelectric converting section at the time of discharging the stored electric charges can be set according to the amount of incident light emitted to the solid-state image sensing device so that the bias voltage can be set to a value based on the remained electric charges which causes unevenness according to the amount of incident light emitted to the solid-state image sensing device. As a result, unevenness of the potential condition of each pixel according to the amount of incident light emitted to the solid-state image sensing device can be prevented just after discharging the remained electric charges of each pixel, that is, just before starting an image sensing operation. The discharging operation of the remained electric charges is performed so that the potential condition of each pixel can be prevented from displacing toward a direction opposite to a displacement direction in the image sensing operation, more effectively than the potential condition during a reset operation. Therefore, the loss caused by the displacement of potential condition after the discharge of the remained electric charges can be reduced.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILD DESCRIPTION OF THE PREFERRED EMBODIMENTS

First Embodiment

Figure 1:
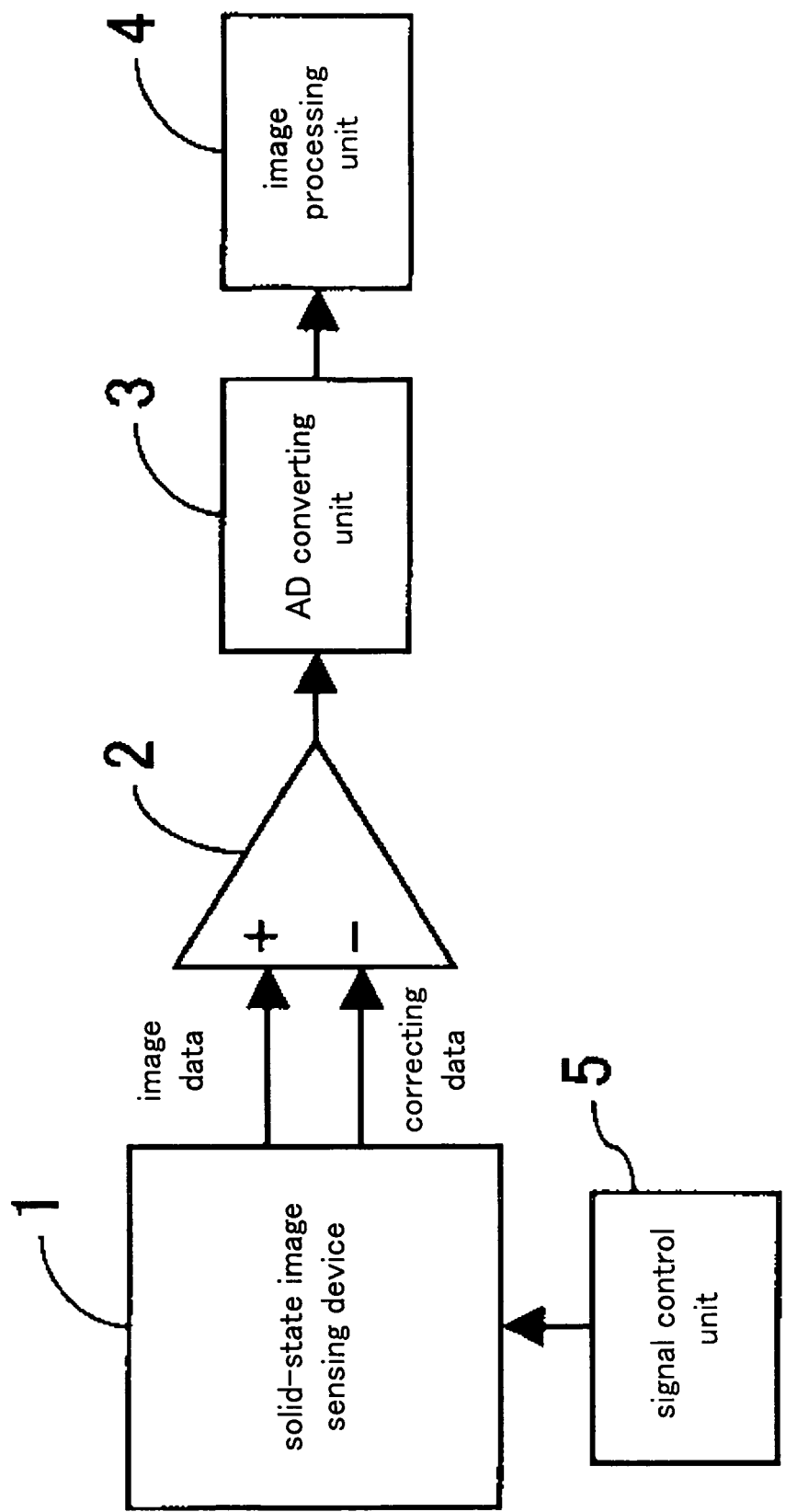
FIG. 1 is a block diagram showing an internal structure of an image sensing device of a first embodiment.
Figure 2:
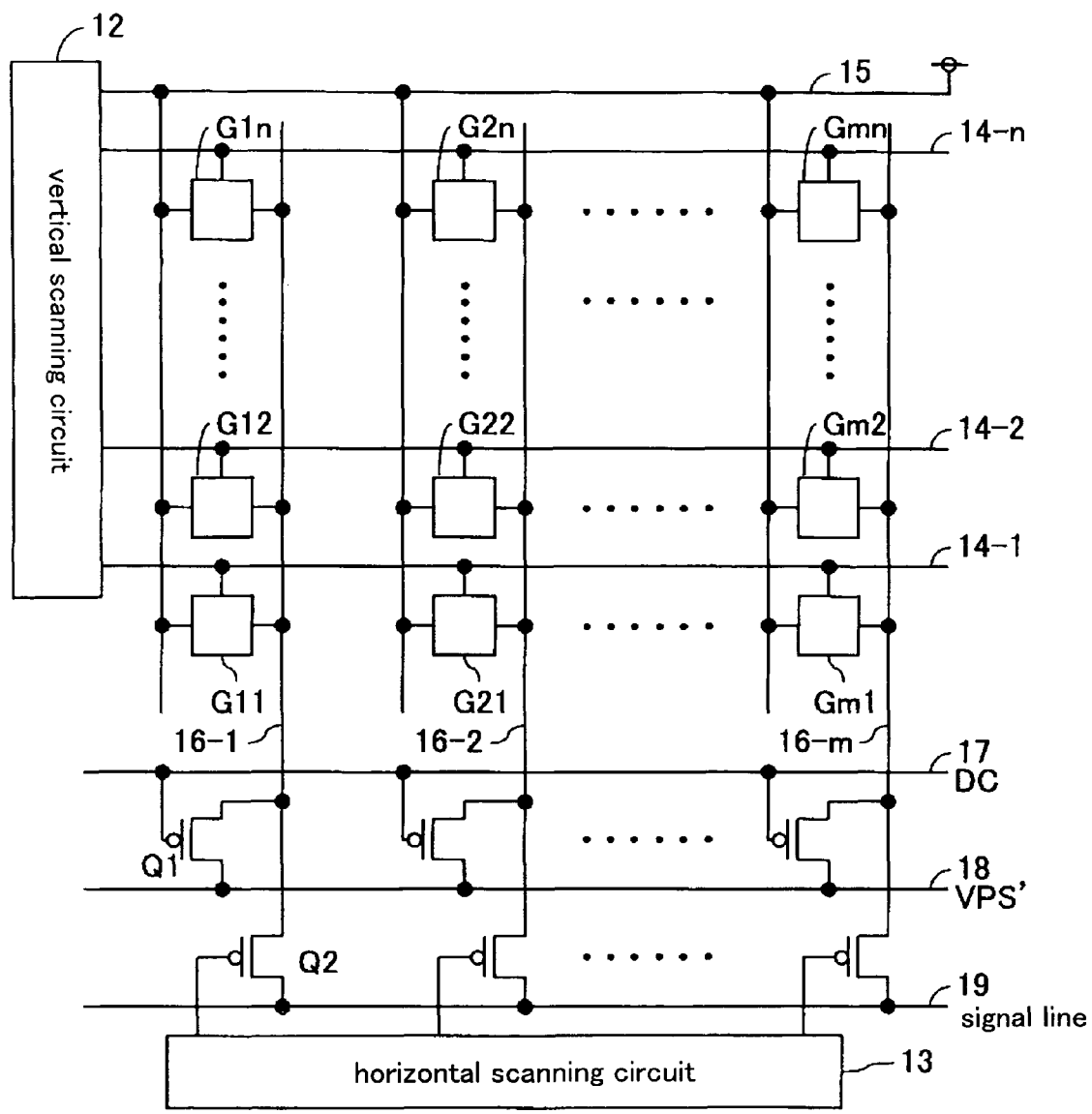
FIG. 2 is a block diagram showing a schematic structure of a solid-state image sensing device.

There will be explained below a first embodiment of the present invention with reference to drawings. FIG. 1 is a block diagram showing an internal structure of an image sensing device of the present embodiment. FIG. 2 is a block diagram showing a schematic two-dimensional structure of a part of an MOS type solid-state image sensing device provided to the image sensing device of FIG. 1.

A image sensing device of the present embodiment includes, as shown in FIG. 1, a solid-state image sensing device 1 for outputting image signal according to an amount of incident light by taking an image of an object, a subtracter 2 for subtracting image data and correcting data which are output from the solid-state image sensing device 1 and generating a denoising image signal, an AD converting unit 3 for converting the image signal from the subtracter 2 into a digital signal, an image processing unit 4 for performing various image processes for image signals converted into digital signals by the AD converting unit 3, and a signal control unit 5 configured to control a voltage value of each signal in the solid-state image sensing device 1.

In the image sensing device with such structure, as shown in FIG. 2, the solid-state image sensing device 1 includes pixels G11 to Gmn arranged in a matrix pattern and having a structure shown in FIG. 1, a vertical scanning circuit 12 for scanning lines 14-1, 14-2, . . . , 14-n sequentially, a horizontal scanning circuit 13 for sequentially reading photoelectric converting signals led to output signal lines 16-1, 16-2, . . . , 16-m per pixel in a horizontal direction, lines 14-1 to 14-n for transmitting signals from the vertical scanning circuit 12 to the pixels G11 to Gmn, a power source line 15 for supplying power to the pixels G11 to Gmn, and an output signal line 16-1 to 16-m configured to be given signals from the pixels G11 to Gmn. Not only the lines 14-1, 14-2, . . . , 14-n, the output signal lines 16-1, 16-2, . . . , 16-m and the power source line 15 but also another lines (for example, a clock line, a bias supplying line or the like) are connected with the pixels, but those lines are omitted in FIG. 2.

One set of P-channel MOS transistors Q1 and Q2 are provided to the respective output signal lines 16-1, 16-2, . . . , 16-m as shown in the drawing. Description will be given taking the output signal line 16-1 for instance. A gate of the MOS transistor Q1 is connected with a DC voltage line 17, its drain is connected with the output signal line 16-1, and its source is connected with a line 18 of a DC voltage VPS'. On the other hand, a drain of the MOS transistor Q2 is connected with the output signal line 16-1, its source is connected with a final signal line 19, and its gate is connected with the horizontal scanning circuit 13.

Figure 3:
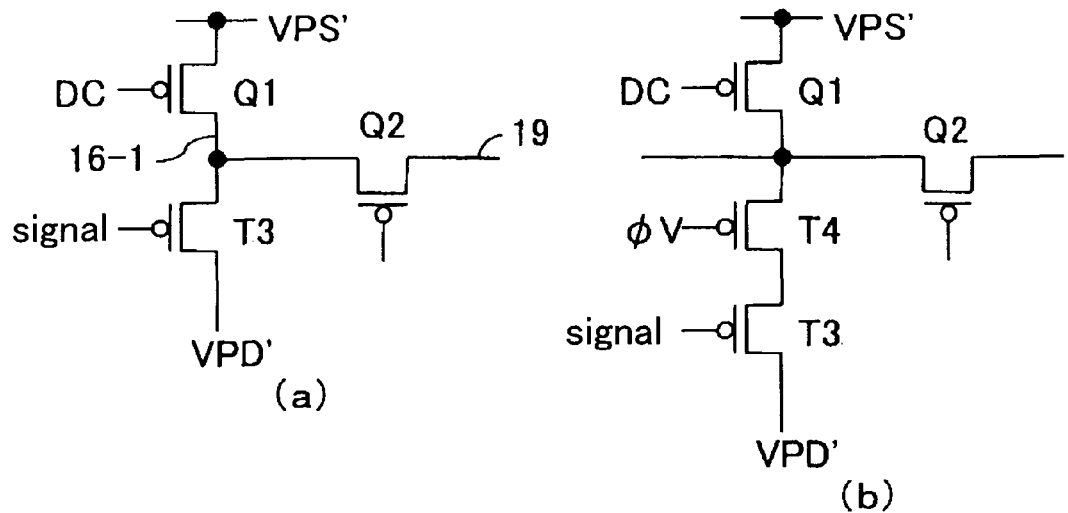
FIGS. 3A and 3B are circuit diagrams showing structures of a part of the solid-state image sensing device in FIG. 2.

An MOS transistor T3 for outputting a signal based on photoelectric charges created in the pixels G11 through Gmn is provided to the pixels G11 through Gmn as mentioned below. A connecting relationship between the MOS transistor T3 and the MOS transistor Q1 is as shown in FIG. 3A. Here, a relationship between a DC voltage VPS' connected with the source of the MOS transistor Q1 and a DC voltage VPD' connected with a drain of the MOS transistor T3 can be described as VPD'<VPS', and the DC voltage VPS' is a ground voltage (grounding), for example. In the circuit configuration, a signal is input to a gate of the upper MOS transistor T3, and a DC voltage DC is always applied to the gate of the lower MOS transistor Q1. For this reason, the lower MOS transistor Q1 is equivalent to resistance or a constant-current source, and the circuit in FIG. 3A is a source follower type amplifier. In this case, it may be considered that an electric current is amplified to be output from the MOS transistor T3.

The MOS transistor Q2 is controlled by the horizontal scanning circuit 13 and operates as a switching element. Here, as mentioned below, an MOS transistor T4 for switching is also provided to the pixels in the solid-state image sensing device of each embodiment. The circuit configuration in FIG. 3B shows the MOS transistor T4 added to the circuit configuration in FIG. 3A. Namely, the MOS transistor T4 is inserted between the MOS transistor Q1 and the MOS transistor T3. The MOS transistor T4 selects a line, and the MOS transistor Q2 selects a row.

With the configurations in FIGS. 3A and 3B, a signal is amplified and output. Therefore, in the case where a pixel natural-logarithmically converts a photoelectric current which is created from a photosensitive element in order to widen a dynamic range, an output signal is small in the original state. However, the signal is amplified to be a sufficient size by the amplifier. Therefore, a process performed in a following signal processing circuit (not shown) will be easier. Moreover, the MOS transistor Q1 composing a load resistance portion of the amplifier is not provided to the pixel but provided to respective output signal lines 16-1, 16-2, ..., 16-m connected with plural pixels arranged in a row direction. As a result, a number of load resistors or constant-current sources can be reduced, thereby reducing an area of the amplifier occupying a semiconductor chip.

Figure 4:
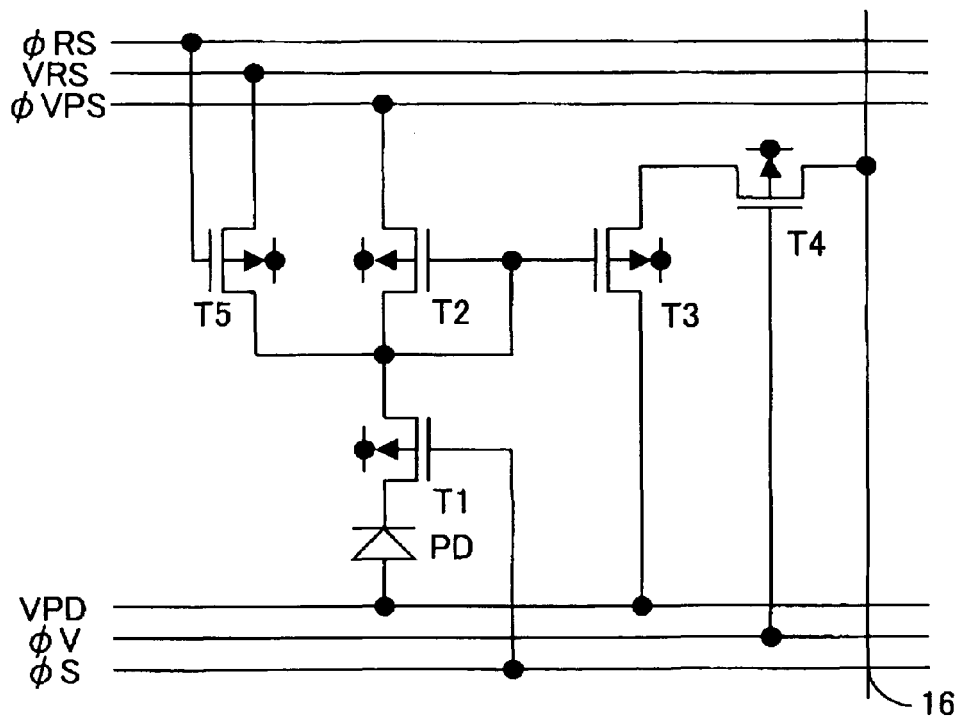
FIG. 4 is a circuit diagram showing a structure of a pixel provided to a solid-state image sensing device included in the image sensing device of the first embodiment.
Figure 17:
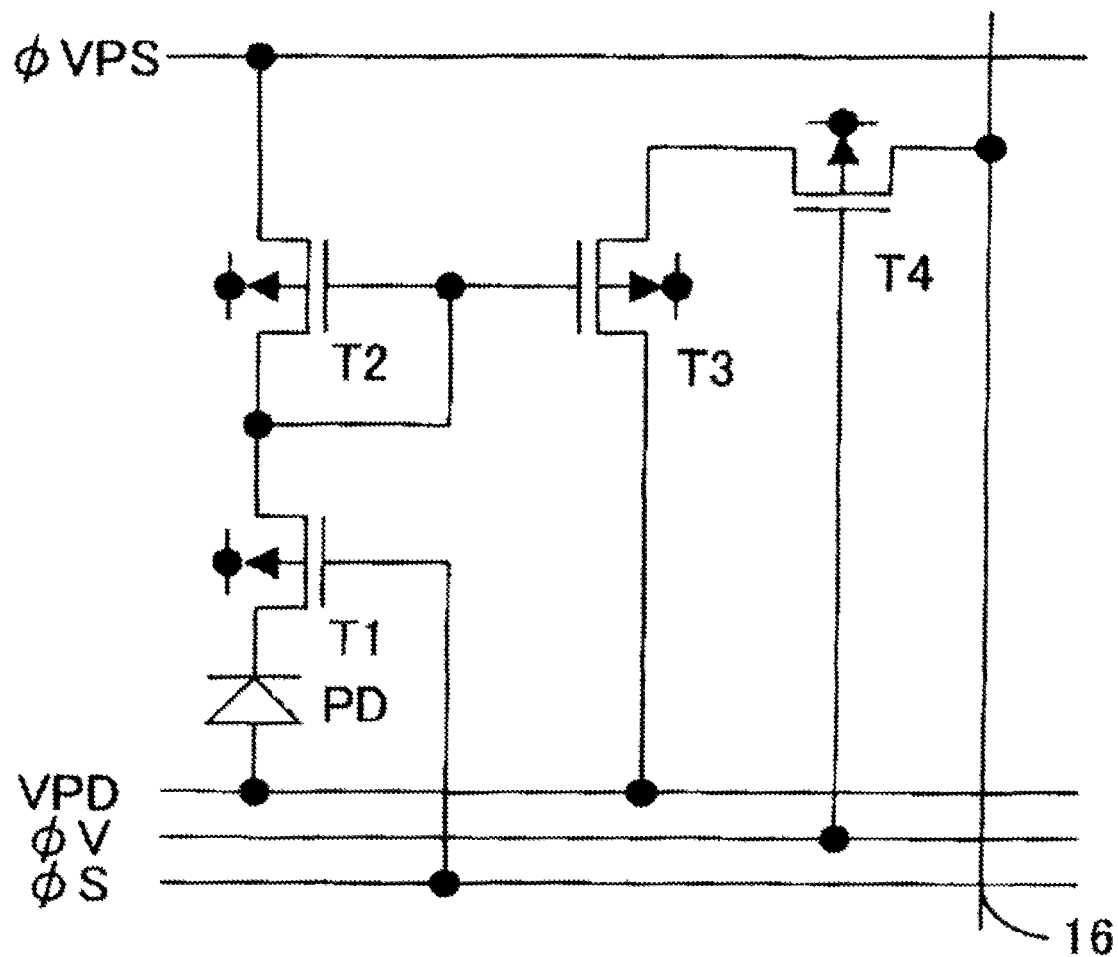
FIG. 17 is a circuit diagram showing a structure of a pixel provided to a conventional solid-state image sensing device.
Figure 18:
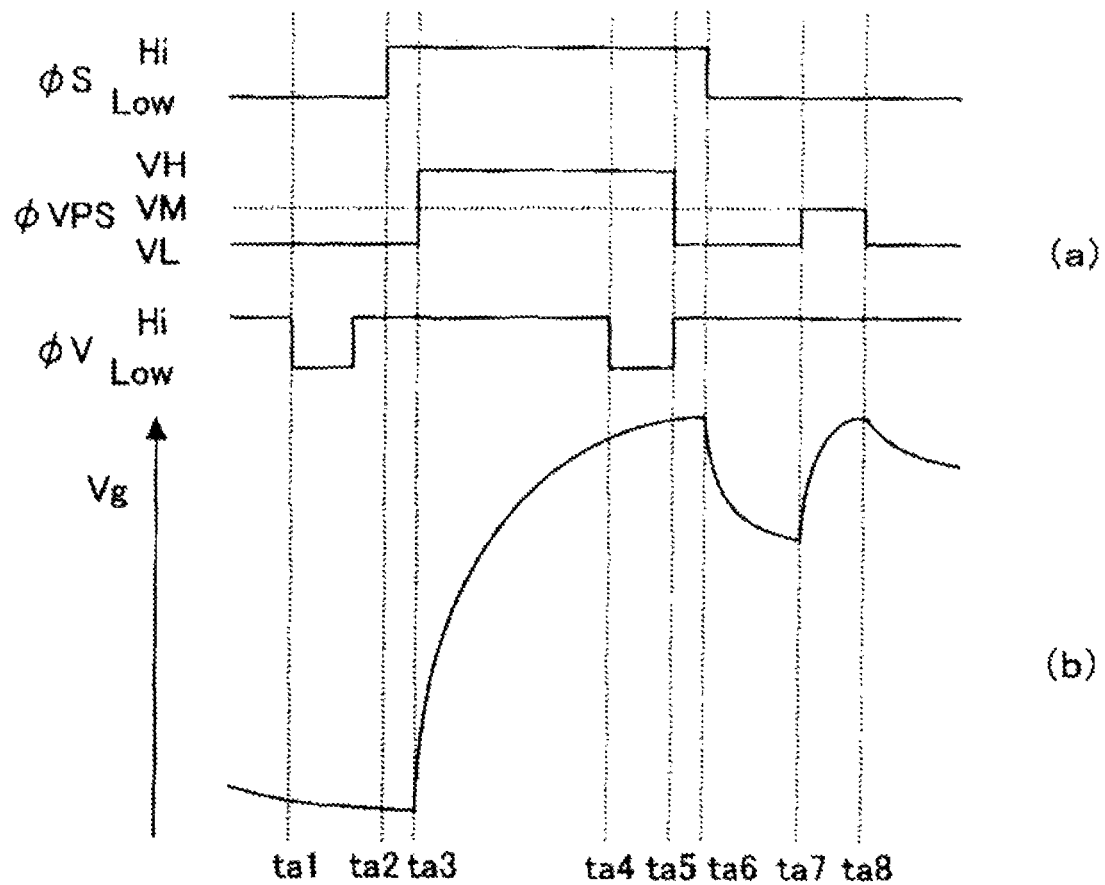
FIGS. 18A and 18B are timing diagrams showing an operation of the pixel in FIG. 17.

The structure of the pixels G11 to Gmn provided to the solid-state image sensing device 1 will be explained with reference to the circuit diagram in FIG. 4. Here, in the pixel shown in FIG. 4, the similar parts in the pixel to FIG. 17 are designated by similar reference numerals, and detailed explanation thereof is omitted. The pixel having the structure shown in FIG. 4 is arranged so that an MOS transistor T5 is added. A drain of the MOS transistor T5 is connected with a connecting node between the drain and gate of the MOS transistor T2. A signal φ RS is given to a gate of the MOS transistor T5 and DC voltage VRS is applied to a source of the MOS transistor T5.

Figure 5:
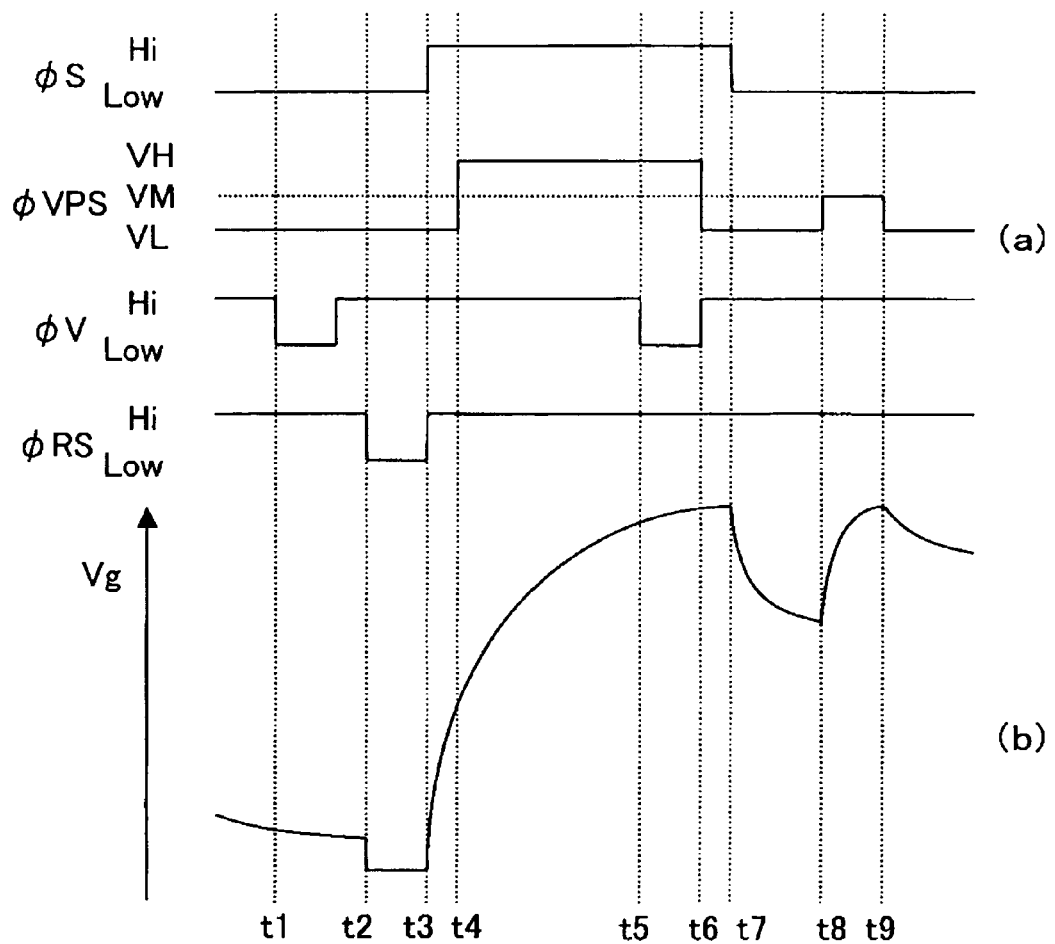
FIGS. 5A and 5B are timing diagrams showing an operation of the pixel in FIG. 4.

The operation of a pixel having the structure shown in Fig.4 will be explained with reference to timing diagrams in FIGS. 5A and 5B. FIG. 5A is a timing diagram showing a transition in conditions of each signal given to the pixel, and FIG. 5B is a timing diagram showing a transition of the gate voltage Vg of the MOS transistor T2. According to the structure of a pixel shown in FIG. 4, the signal φ RS is brought into low level and the MOS transistor T5 is turned on, and then, the signal φ RS is brought into high level and the MOS transistor T5 is turned off. Further, after the signal φ VPS is brought into VL, an image sensing operation is started. Here, when the gate and drain of the MOS transistor T2 are electrically connected with the cathode of the photodiode PD, light is emitted in the photodiode PD so that photocurrent is created in accordance with an amount of incident light.

When the brightness of the object is low, because the MOS transistor T2 is in cutoff state, photocurrent charges are stored in the gate of the MOS transistor T2 and a voltage which is linearly proportional to the amount of incident light emitted to the gates of the MOS transistors T2 and T3 is generated. When the brightness of the object is high and the voltage according to the amount of the photocurrent charges stored in the gate of the MOS transistor T2 is low, the MOS transistor T2 starts to operate in a sub-threshold region so that a voltage which is natural-logarithmically proportional to the amount of the incident light is generated at the gate of the MOS transistor T2. Therefore, the gate voltage Vg of the MOS transistor T2 reduces, as shown in FIG. 5B, according to the amount of the incident light.

Subsequently, at Time t1, by giving a pulse signal φ V in low level to the gate of the MOS transistor T4, the MOS transistor T4 is turned on, and a drain current amplified by a gate voltage of the MOS transistor T3 flows as an output electric current to the output signal line 16 (corresponding to the output signal lines 16-1 to 16-m in FIG. 2) via the MOS transistors T3 and T4. The output electric current output to the output signal line 16 has a value proportional to a linear or natural logarithmic value of an amount of the incident light. At this time, a drain voltage of the MOS transistor Q1, which is determined by resistance at the time of energizing the MOS transistor T3 and the MOS transistor Q1 (FIG. 2) and electric currents flowing therein, appears as a signal in the output signal line 16. In such a manner, the image data is output.

After the image data is output in such a manner, the signal φ V is brought into high level, the signal φ RS is brought into low level, and the MOS transistor T5 is turned on at Time t2.

As a result, the DC voltage VRS applied to the source of the MOS transistor T5 is given to the connecting node between the gate and drain of the MOS transistor T2 via the MOS transistor T5. As shown in FIG. 5B, the gate voltage Vg of the MOS transistor T2 can be brought into the DC voltage VRS compulsorily.

As described above, turning on the MOS transistors T5 in all pixels G11 to Gmn after an image sensing operation allows the gate voltages Vg of the MOS transistors T2 in pixels being equivalent voltage values. The voltage value of the DC voltage VRS applied to the source of the MOS transistor T5 is set to a voltage value (a voltage value at a light condition) which is lower than the gate voltage Vg generated at the gate of the MOS transistor T2 after the age sensing operation.

At Time t3, when the signal φ RS is brought into high level and the MOS transistor T5 is turned off, the signal φ S is brought into high level and the MOS transistor T1 is turned off. The electrical connection between the cathode of the photodiode PD and the drain of the MOS transistor T2 is disconnected and a reset operation is started. Here, positive electric charge flows from the side of the source of the MOS transistor T2, and recombine with the negative electric charge stored at the gate and drain of the MOS transistor T2 and the gate of the MOS transistor T3. As a result, as shown in FIG. 5B, the gate voltage Vg of the MOS transistor T2 gradually increases from the voltage value VRS.

At Time t4, the signal φ VPS is brought into VH and the source voltage of the MOS transistor T2 is increased. As the signal φ VPS is brought into VH in this way, the amount of positive electric charge flowing from the side of the source of the MOS transistor T1 increases and the negative electric charge stored at the gate and drain of the MOS transistor T2 and the gate of the MOS transistor T3 recombines promptly. As a result, at Time t4, a change rate of the gate voltage Vg of the MOS transistor T2 becomes high, and the voltage value of the gate voltage Vg of the MOS transistor T2 further increases as shown in FIG. 5B.

While the reset operation is performed in such way, at Time t5, a pulse signal φ V in low level is given and the MOS transistor T4 is turned on. Consequently, drain current amplified by the gate voltage of the MOS transistor T3 which is already reset is output as output current to the output signal line 16 via the MOS transistors T3 and T4. A drain voltage of the MOS transistor Q1, which is determined by output current output to the output signal line 16, appears as a signal in the output signal line 16. This signal reflects a threshold voltage of the MOS transistor T2, and this signal is obtained to each pixel, thereby detecting sensitivity unevenness of the pixels. The signal is output as correcting data for correcting sensitivity unevenness.

At Time t6, the signal φ VPS is brought into VL and the signal φ V is brought into high level. At Time t7, the signal φ S is brought into low level. In such way, by tuning on the MOS transistor T1, the cathode of the photodiode PD and the drain and gate of the MOS transistor T2 are connected. Here, as shown in FIG. 5B, the electric charge remained at the photodiode PD causes a decrease of the gate voltage Vg of the MOS transistor T2 and an appearance of an after-image.

At Time t8, as the voltage value of the signal φ VPS is brought into VM, the MOS transistor T2 is temporarily conducted so that the remained electric charge stored among the photodiode PD, the anode of the photodiode PD and the drain of the MOS transistor T2 is recombined. As a result, as shown in FIG. 5B, the gate voltage Vg of the MOS transistor T2 becomes high. At Time t9, the signal φ VPS is brought into VL and the next image sensing operation is started. Voltage values of the signals φS, φV, φRS and φVPS which are given at timings shown in FIG. 5A are respectively controlled by a signal control unit 5.

As the respective pixels G11 to Gmn perform an image sensing operation in this way, the image data and the correcting data are output from the respective pixels. Here, when the image data and the correcting data from the pixels G11 to Gmn are output from the solid-state image sensing device 1, those values are inverted. That is, an output value of the image data increases as the brightness value increases. Here, the image data and the correcting data output from the solid-state image sensing device 1 are given to a noninverting input terminal and a inverting input terminal of the subtracter 2.

In the subtracter 2, the correcting data from the solid-state image sensing device 1 is subtracted from the image data from the solid-state image sensing device 1, and the image data whose unevenness of pixels are reduced with the correcting data is output as an image signal. In the subtracter 2, a subtracting process is performed on the image data and the correcting data within a same pixel. When the image signal output from the subtracter 2 is given to the AD converting unit 3 and converted into a digital signal, the converted digital signal is given to the image processing unit 4. In the image processing unit 4, various image processes such as offset voltage process, white balance process, color balancing process, Y correcting process, edge enhancement process, or gradation process are performed.

As described above, in the present embodiment, after screen image data is output, the gate voltages Vg of the MOS transistors T2 of the respective pixels G11 to Gmn are firstly set equivalent, and then, a reset operation is started. Therefore, the unevenness of the gate voltages Vg of the MOS transistors T2 generated after outputting the screen image data (Time t1) is countered by the time of starting a reset operation (Time t3). Because the reset operation is started in the condition that the gate voltages Vg of the MOS transistors T2 are equivalent, the gate voltages Vg of the MOS transistors T2 can be set as an approximately constant values regardless of the value of the screen image data at the time of removing an after-image after the reset operation is finished (Times t7 to t9). As a result, the gate voltage Vg of the MOS transistors T2 at the time of starting the image sensing operation can be kept constant.

Second Embodiment

Figure 6:
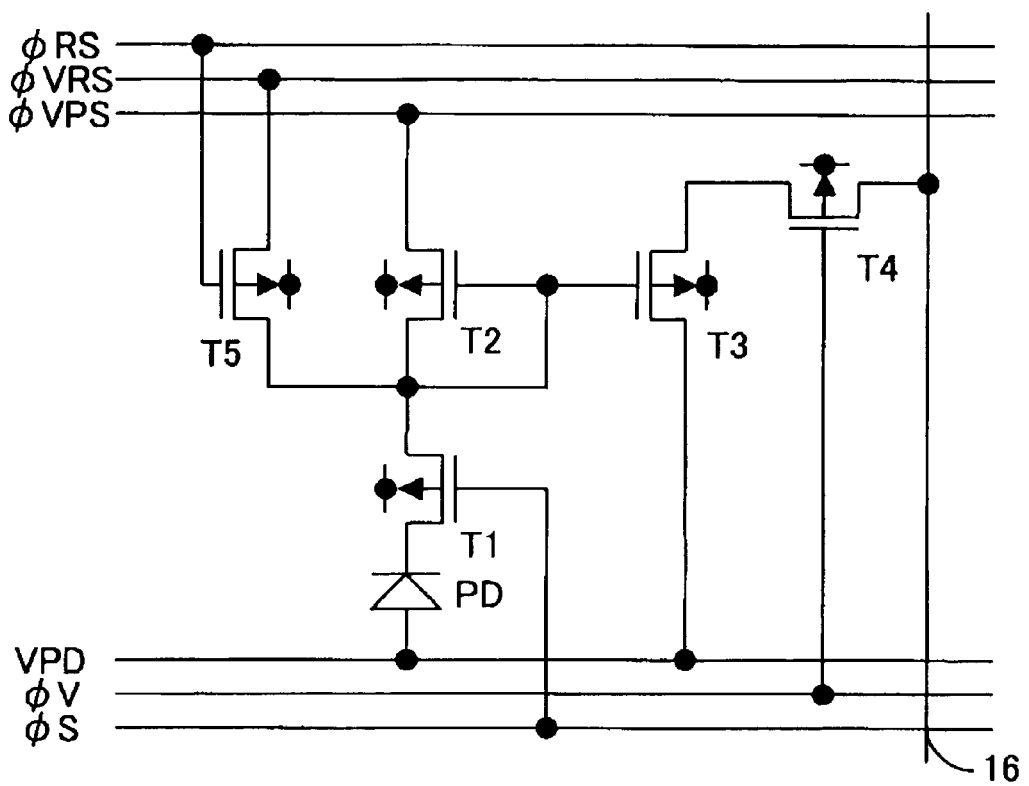
FIG. 6 is a circuit diagram showing a structure of a pixel provided to a solid-state image sensing device included in an image sensing device of a second embodiment.

A second embodiment of the present invention will be explained with reference to drawings. FIG. 6 is a circuit diagram showing an internal structure of a pixel provided to a solid-state image sensing device included in an image sensing device of the present embodiment. Here, in the pixel shown in FIG. 6, the similar parts in the pixel of FIG. 4 are designated by similar reference numerals, and detailed explanation thereof is omitted. The structures of the image sensing device and the solid-state image sensing device of the present embodiment are the same as that of the first embodiment, which are shown in FIGS. 1 and 2.

According to the pixel provided to the solid-state image sensing device included in the image sensing device of the present embodiment, as shown in FIG. 6 and differently from the pixel shown in FIG. 4, a signal φVRS for switching two values of voltage is provided to a source of an MOS transistor t5. The signal φVRS switches a voltage value VRS1 which is the same as the DC volume VRS of the first embodiment and a voltage value VRS2 which is higher than the voltage value VRS1. Other parts of the pixel of the present embodiment are the same as those of the pixel structure shown in FIG. 4.

Figure 7:
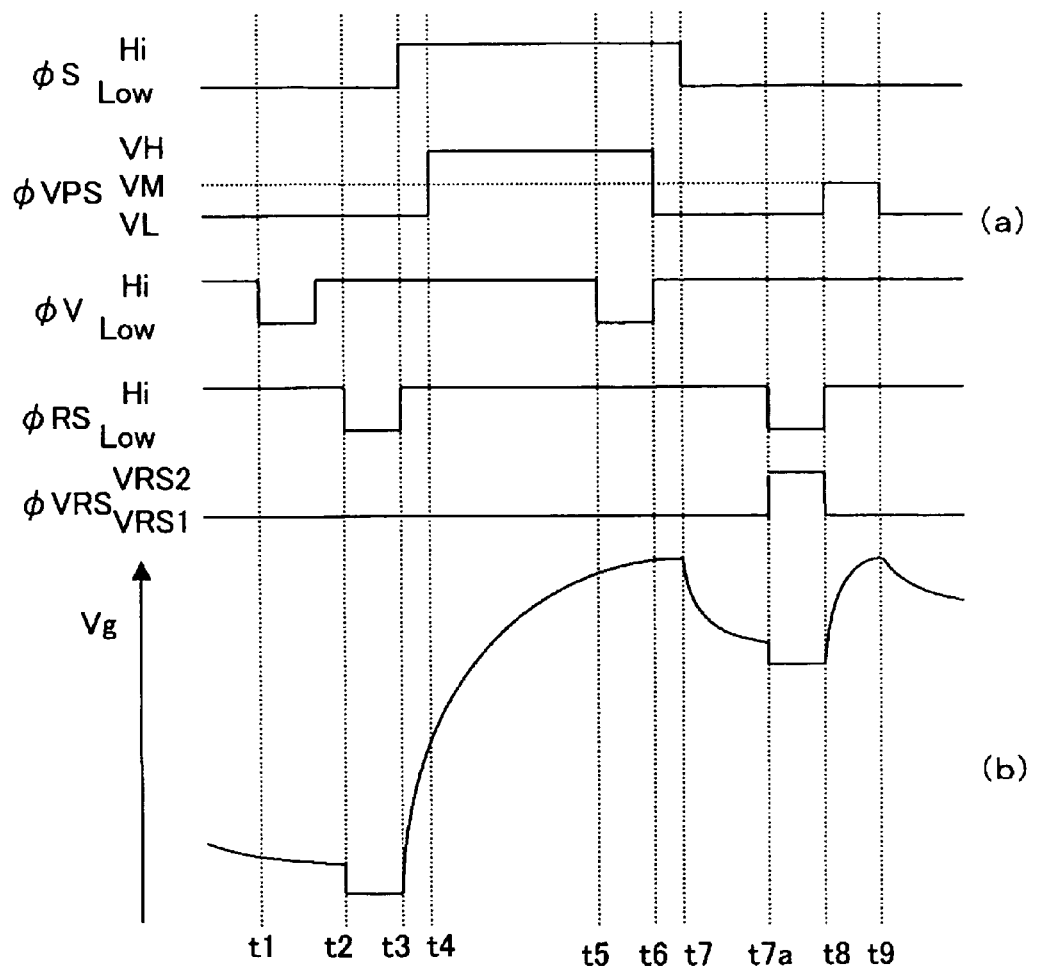
FIGS. 7A and 7B are timing diagrams showing an operation of the pixel in FIG. 6.

An operation of the pixel having the structure shown in FIG. 6 will be explained with reference to timing diagrams in FIGS. 7A and 7B. FIG. 7A is a timing diagram showing a transition of conditions of each signal given to the pixel, and FIG. 7B is a timing diagram showing a transition of the gate voltage VG of the MOS transistor T2. As in the case with the first embodiment, an image sensing operation is started in the condition that a signal φS is set in low level, a signal φRS is set in high level, and a signal φVPS is set to VL.

At Time t1, after a signal φV is brought into low level and image data is output, the signal φV is brought into high level. At Time t2, a pulse signal φRS in low level is given and an MOS transistor T5 is turned on. Here, the voltage value of the signal φVRS given to a source of the MOS transistor T5 is set to VRS1 and a gate voltage Vg of an MOS transistor T2 is compulsorily set to a DC voltage VRS1 as shown in FIG. 7B. That is, the gate voltage Vg of the MOS transistor T2 is brought into a voltage value (a voltage value in light condition) which is lower than the gate voltage Vg generated in a gate of the MOS transistor T2 after an image sensing operation.

At Time t3, the signals φRS and φS are brought into high level, and at Time t4, the voltage value of the signal φVPS is brought into VH. As a result, by resetting so as to increase the gate voltage Vg of the MOS transistor T2 as shown in FIG. 7B, the signal φV in low level is output as correcting data at Time t5. At Time t6, the voltage value of the signal φVPS is brought into VL and the signal φV is brought into high level. At Time 7, the signal φS is brought into low level. Here, an cathode of a photodiode PD and the drain and gate of the MOS transistor T2 are connected so that the gate voltage Vg of the MOS transistor T2 decreases as shown in FIG. 7B, and an after-image appears.

The cathode of the photodiode PD and the drain and gate of the MOS transistor T2 are connected in this way, and at Time t7a, the signal φRS is brought into low level and the voltage value of the signal φVRS is set to VRS2. Consequently, as shown in FIG. 7B, the gate voltage Vg of the MOS transistor T2 is compulsorily set to DC voltage VRS2. That is, the gate voltage Vg of the MOS transistor T2 is brought into a voltage value (a voltage value of an after-image in light condition) which is lower than the gate voltage Vg of the MOS transistor T2 in the condition that an after-image appears.

At Time t8, the voltage value of the signal φVPS is brought into VM to recombine remained charge stored in the photodiode PD and the drain of the MOS transistor T2 and the gate voltage Vg of the MOS transistor T2 is brought into high level as shown in FIG. 7B. At Time t9, the signal φVPS is brought to VL and the next image sensing operation is started. Voltage values of the signals φS, φV, φRS, φVPS and φVRS which are given at timings shown in FIG. 7A are controlled by a signal control unit 5.

As described above, in the present embodiment, after screen image data is output, the gate voltages Vg of the MOS transistor T2 of the respective pixels G11 to Gmn are firstly set equivalent, and then, a reset operation is started. Therefore, unevenness of the gate voltages Vg of the MOS transistors T2 generated after outputting the screen image data (Time t2) is countered by the time of outputting correcting data (Time t5). As a result, the gate voltage Vg of the MOS transistor T2 at the time of outputting the correcting data can be set to a constant value regardless of the value of the screen image data.

When a voltage caused by an after-image appears as a gate voltage Vg of the MOS transistor T2 after the reset operation is finished (Time t7), the gate voltages Vg of the MOS transistors T2 of the respective pixels G11 to Gmn are set equivalent (Time t7a) and an after-image reducing operation is performed (Time t8). Therefore, the unevenness of the gate voltages Vg of the MOS transistors T2 generated after the reset operation is finished (Time t7) is countered by the time of starting an image sensing operation (Time t9). As a result, the gate voltage Vg of the MOS transistor T2 can be set to a constant value regardless of the amount of the electric charge stored in the anode of the photodiode PD and the drain and gate of the MOS transistor T2.

Figure 8:
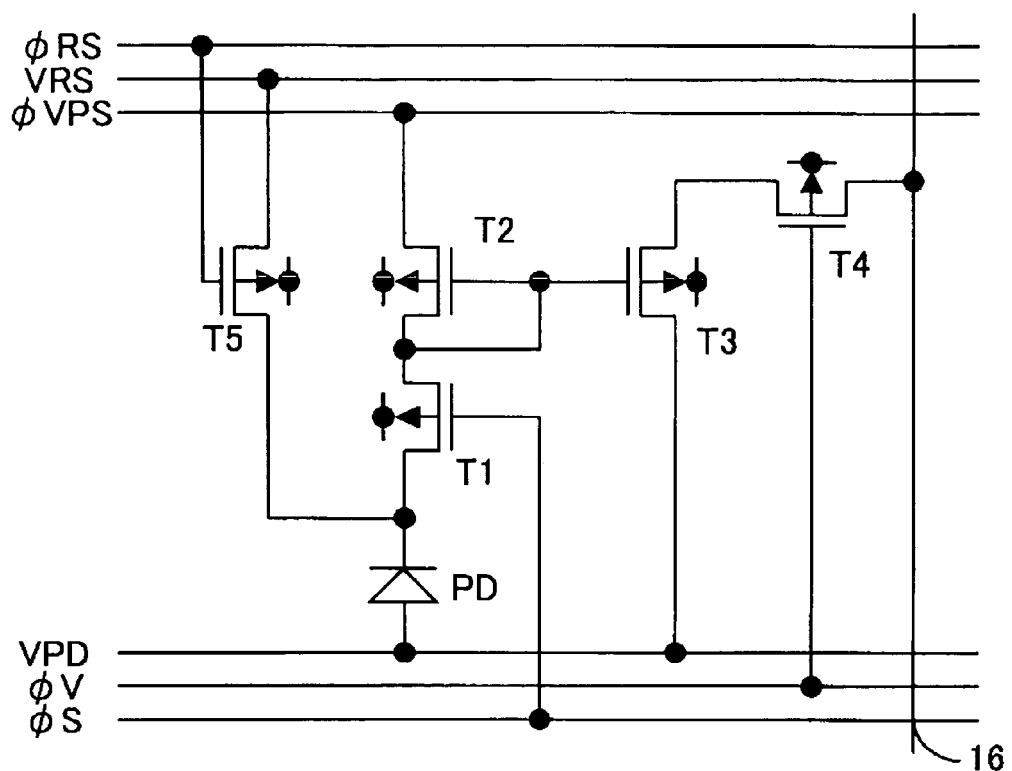
FIG. 8 is a circuit diagram showing another structure of the pixel provided to the solid-state image sensing device included in the image sensing device of the first embodiment.

According to the first and second embodiment, the drain of the MOS transistor T5 is configured to be connected to the connecting node between the source of the MOS transistor T1 and the drain of the MOS transistor T2. However, as shown in FIG. 8, the drain of the MOS transistor T5 may be connected to the connecting node between the drain of the MOS transistor T1 and the cathode of the photodiode PD. Here, FIG. 8 is based on the structure of the pixel (FIG. 4) provided to the image sensing device of the first embodiment.

Third Embodiment

Figure 9:
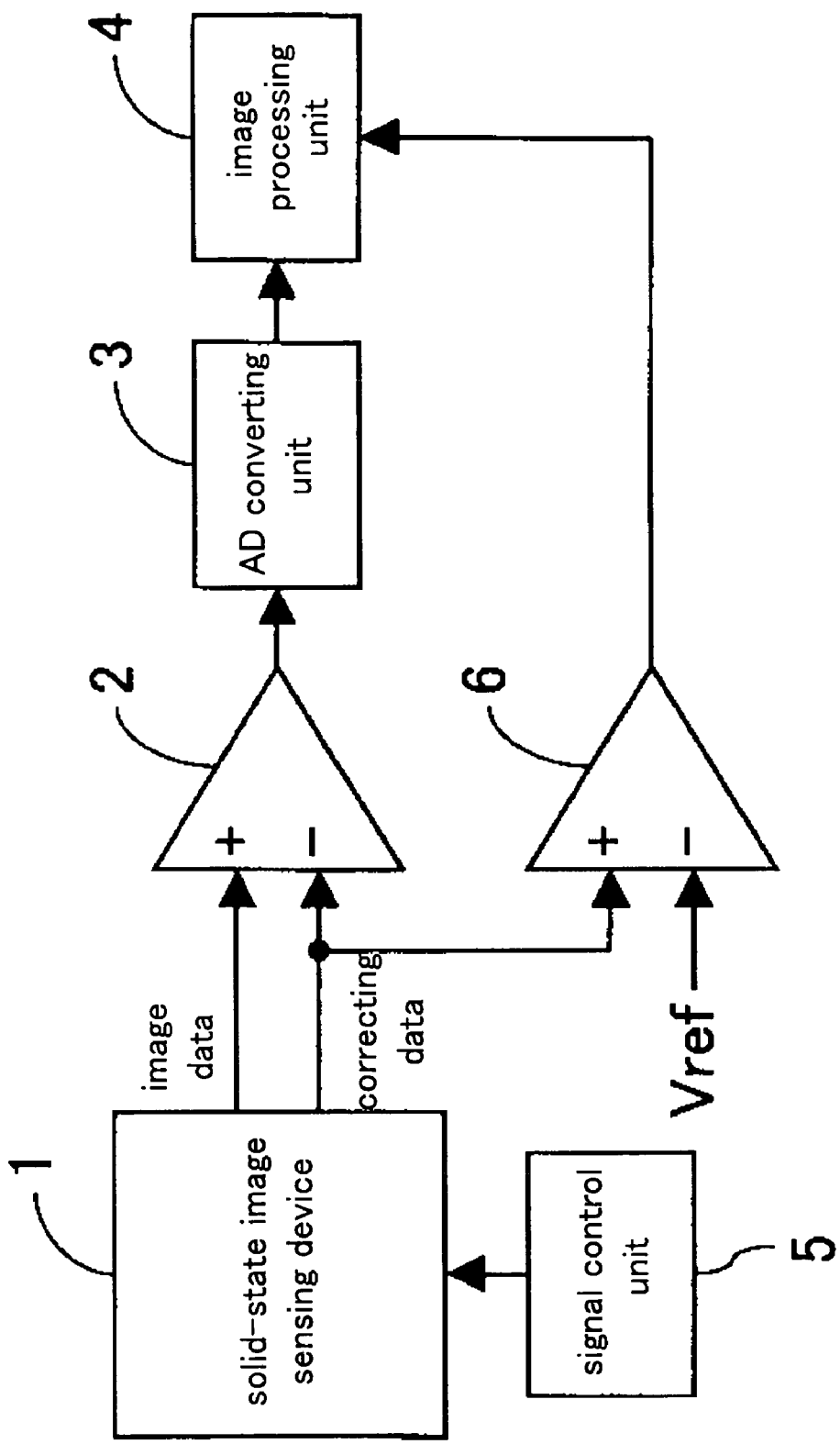
FIG. 9 is a block diagram showing an internal structure of an image sensing device of the third embodiment.
Figure 10:
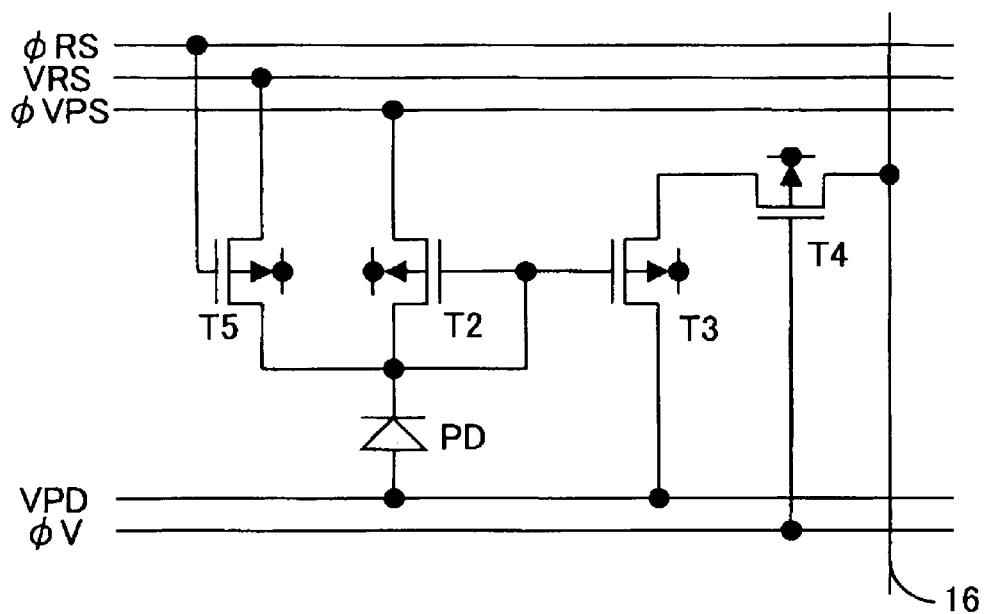
FIG. 10 is a circuit diagram showing a structure of a pixel provided to a solid-state image sensing device included in the image sensing device of third and fourth embodiments.

A third embodiment of the present invention will be described with reference to drawings. FIG. 9 is a block diagram showing a structure of an image sensing device of the present embodiment. FIG. 10 is a circuit diagram showing a structure of a pixel provided to a solid-state image sensing device included in the image sensing device of the present embodiment. Here, in the structures shown in FIGS. 9 and 10, the similar parts in the structures of FIGS. 1 and 4 are designated by similar reference numerals, and detailed explanation thereof is omitted.

In an image sensing device of the present embodiment, as shown in FIG. 9, a comparer 6 is added to the structure shown in FIG. 1. In the comparer 6, correcting data from the solid-state image sensing device is input to a noninverting input terminal and an inverting input terminal. Here, the comparison result which is obtained by comparing the correcting data from the solid-state image sensing device with a threshold value Vref in the comparer 6 is given to an image processing unit 4. The image processing unit 4 confirms whether or not a proper subtracting process is implemented in a subtracter 2.

Figure 11:
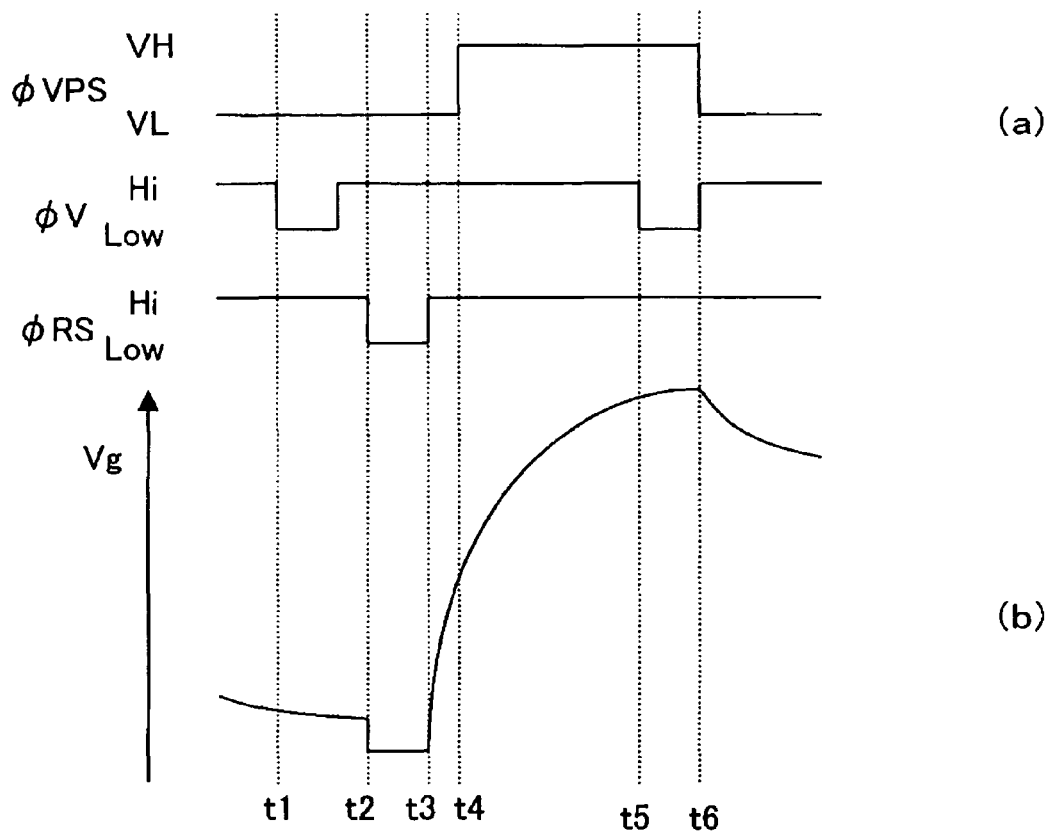
FIGS. 11A and 11B are timing diagrams showing an operation of the pixel in FIG. 10.

In the image sensing device which operates in such way, the structure of the pixels G11 to Gmn in the solid-state image sensing device 1 is as shown in FIG. 10. Namely, the pixel of the present embodiment, as shown in FIG. 10, has a structure in which an MOS transistor T1 is removed from the structure shown in FIG. 4 and a drain and gate of an MOS transistor T2 are connected with a cathode of a photodiode PD. A drain of an MOS transistor T5 is also connected with the cathode of a photodiode PD. An operation of the pixel having the structure shown in FIG. 10 will be explained with reference to timing diagrams in FIGS. 11A and 11B. FIG. 11A is a timing diagram showing a transition of conditions of each signal given to the pixel, and FIG. 11B is a timing diagram showing a transition of the gate voltage VG of the MOS transistor T2.

In the pixel having a structure of FIG. 10, a signal φ RS is brought to high level, a signal φ VPS is brought into VL, and then, an image sensing operation is performed. Here, as shown in FIG. 11B, a gate voltage Vg of the MOS transistor T2 reduces and changes according to an amount of incident light given to the photodiode. At Time t1, a signal φ V is brought into low level, and then, the signal φ V is brought into high level after the image data is output. At Time t2, a pulse signal φ RS in low level is given and the MOS transistor T5 is turned on. As a result, as shown in FIG. 11B, the gate voltage Vg of the MOS transistor T2 is compulsorily set to a DC voltage VRS so that the value is lower than the voltage value after the image sensing operation.

At Time t3, the signal φ RS is brought into high level, and at Time t4, the voltage value of the signal φ VPS is brought into VH. As a result, as shown in FIG. 11B, a reset operation is performed so that the voltage value Vg of the MOS transistor T2 increases. At Time t5, the signal φ V is brought into low level and the correcting data is output. At Time t6, a voltage value of a time signal φ VPS is brought into VL and the signal φ V is brought into high level. After the correcting data is output in such a manner, the next image sensing operation is started.

According to the operation of the pixels G11 to Gmn in the solid-state image sensing device, differently from the first and second embodiments, when the gate voltage Vg of the MOS transistor T2 is reset, the photodiode PD and the MOS transistor T2 are kept connected. Therefore, in the case that the light given to the photodiode PD is a light from an object with high brightness, an electric charge generated in the photodiode PD flows into the MOS transistor T2 so as to influence the gate voltage Vg of the MOS transistor which is to be reset.

Figure 12:
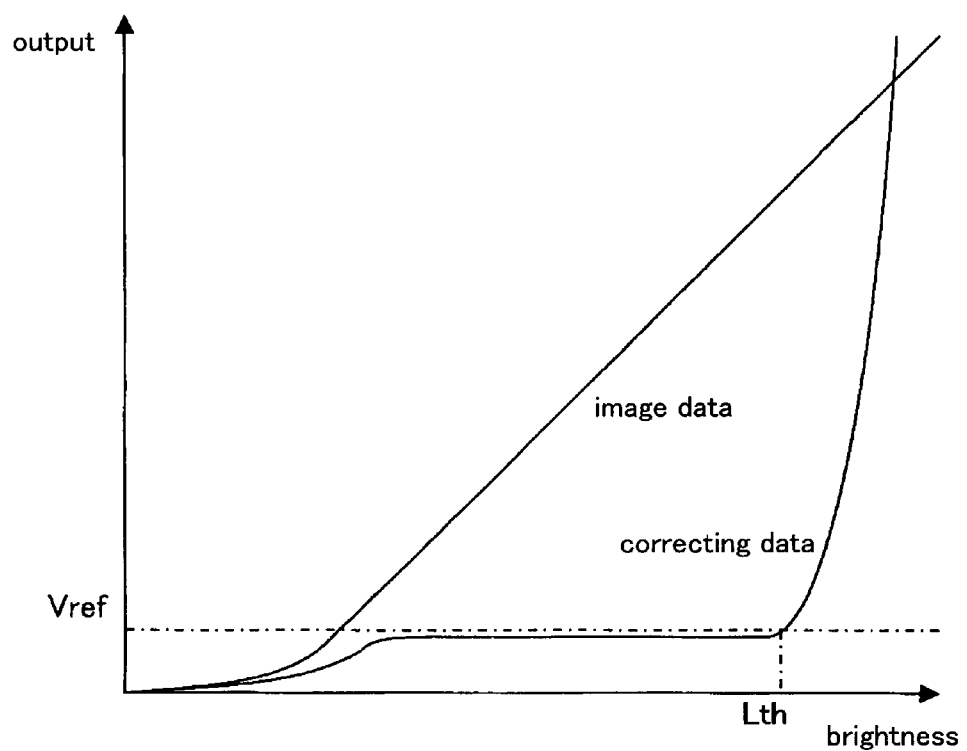
FIG. 12 is a graph showing a relation between image data and correcting data, which are output from the solid-state image sensing device having the pixel of FIG. 10, and brightness values.

Namely, when light from an object with high brightness is emitted to the photodiode PD, the correcting data is output before the voltage value Vg of the MOS transistor T2 is reset to be an adequate high voltage. As a result, the value of the correcting data becomes higher than the image data, and a black-and-white inversion phenomenon occurs. FIG. 12 shows a relation of values of the image data and the correcting data on brightness value of the object. Firstly, as shown in FIG. 12, an output value of the image data increases as the brightness value increases because the gate voltage Vg of the MOS transistor T2 decreases. Here, the values of the image data and the correcting data output from the solid-state image sensing device 1 become inverted values of the gate voltage Vg of the MOS transistor T2. That is, as the amount of incident light increases, the output value of the solid-state image sensing device 1 increases against the decrease of the gate voltage Vg of the MOS transistor T2.

In contrast, transform of the value of the correcting data will be explained. When the value of the incident light is equal or lower than the brightness value Lth, at the time of beginning the reset operation, the voltage value Vg of the MOS transistor T2 is kept constant with DC voltage VRS and an amount of electric charge created in the photodiode PD at the time of resetting is small so that the voltage value Vg of the MOS transistor T2 after resetting is kept within a predetermined value. Therefore, as the brightness value of incident light increases, the output value of the correcting data increases and is kept in constant value which is lower than a threshold value Vref.

However, when the brightness value of incident light becomes higher than Lth, an amount of electric charges created in the photodiode PD at the time of resetting increases and it provides a greater influence on the voltage value Vg of the MOS transistor T2. As a result, a change rate of the voltage value Vg of the MOS transistor T2 becomes small and the voltage value Vg of the MOS transistor T2 after resetting becomes low. Therefore, when the brightness value of incident light is higher than Lth, as the brightness value increases, the output value of correcting data is monotonically increases and becomes higher than the threshold value Vref. Further, when the brightness value of the incident light becomes ultra-high, the output value of the correcting data exceeds the output value of the image data.

As described above, when the brightness of incident light becomes higher than the brightness value Lth, the output value of the correcting data rapidly increases according to the increase of the brightness value. Therefore, when a subtracting process is performed on the correcting data and the image data output from the solid-state image sensing device 1 in the subtracter 2, and when the brightness value of incident light becomes high, the value of the image data corresponding to the brightness value becomes small. As a result, a black-and-white inversion phenomenon, in which a bright part is regenerated as a dark part, actually occurs.

In contrast, according to the present embodiment, the comparer 6 is provided as shown in FIG. 9 so that the correcting data output from the solid-state image sensing device 1 is compared with the threshold value Vref. When the value of the correcting data output from the solid-state image sensing device 1 is lower than the threshold value Vref, as shown in FIG. 12, the correcting data is reset to a predetermined value. Therefore, when a signal in low level is output from the comparer 6, the image processing unit 4 confirms that the brightness value of the object is in a brightness range in which a black-and-white inversion phenomenon may not occur, and that a proper subtracting process is performed in the subtracter 2. The image processing unit 4 processes an image signal which is subtracted in the subtracter 2 and converted to a digital signal in the AD converting unit 3.

When the value of correcting data output from the solid-state image sensing device 1 is larger than the threshold value Vref, as shown in FIG. 12, it is reset to be monotonically increased based on the brightness value. Therefore, a signal in high level is output from the comparer 6, and the image processing unit 4 confirms the brightness value of the object is in the brightness range in which a black-and-white phenomenon may occur and that a proper subtracting process is not performed in the subtracter 2. As a result, in the image processing unit 4, an image signal corresponding to the highest brightness value in a photographable dynamic range is read and processed.

Figure 19:
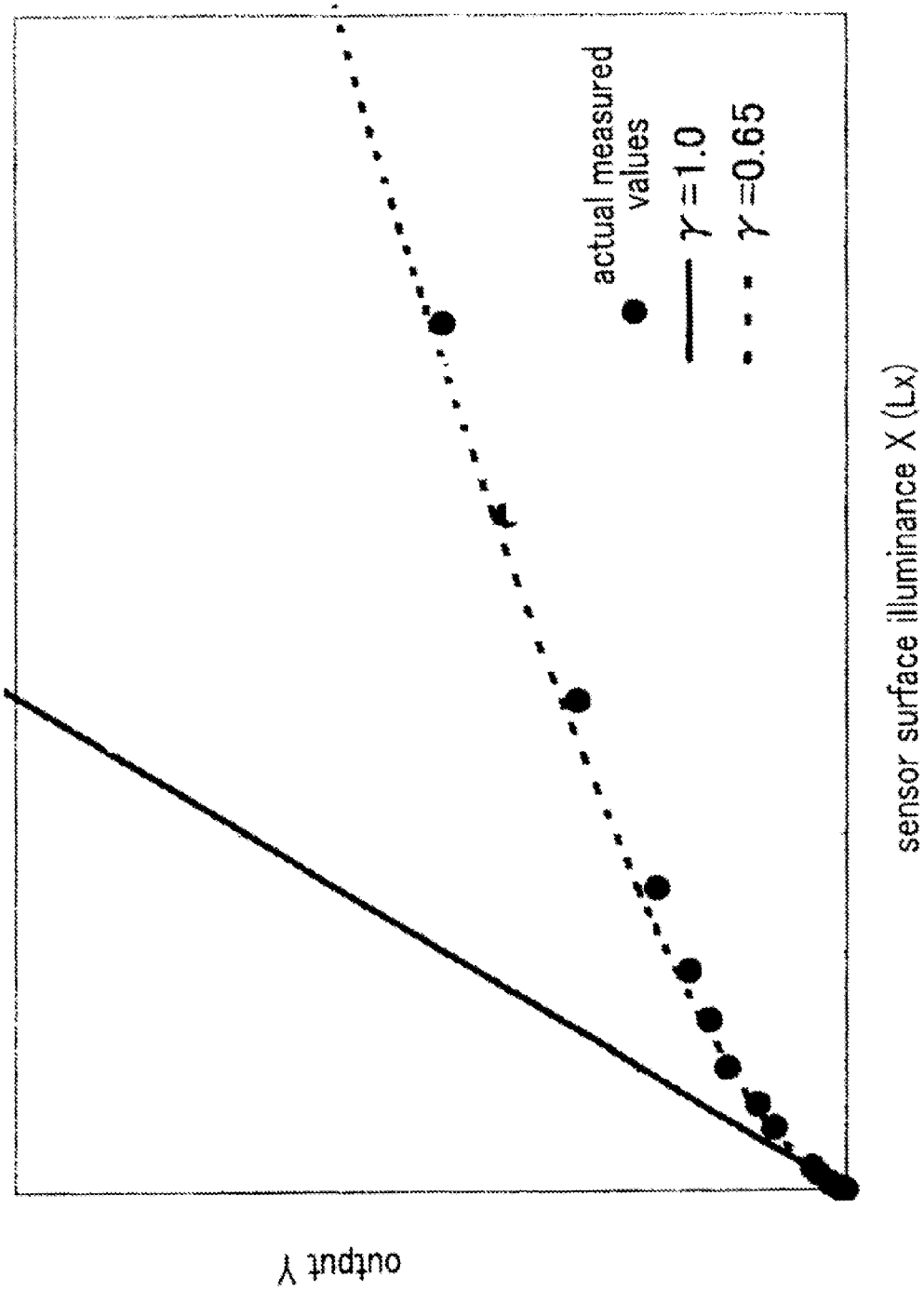
FIG. 19 is a graph showing a relation between outputs from the conventional solid-state image sensing device and sensor surface illuminance.

As described above, according to the present embodiment, an MOS transistor T1 which functions as a switch for electrically connecting and disconnecting the photodiode PD and the MOS transistor T2 is removed from the structure of the pixels G11 to Gmn. Therefore, the circuit dimension in each pixel can be reduced. Further, because operation for reducing after-image is not necessary, the output loss caused by the after-image reducing operation, as shown in FIG. 19, can be prevented. Moreover, a part in which the output value of the correcting data monotonically changes according to the brightness value can be confirmed and the image processing unit 4 processes by reading a signal corresponding to the highest brightness value. As a result, a black-and-while inversion phenomenon caused by a connection between the photodiode PD and the MOS transistor T2 at the time of resetting can be prevented.

Fourth Embodiment

Figure 13:
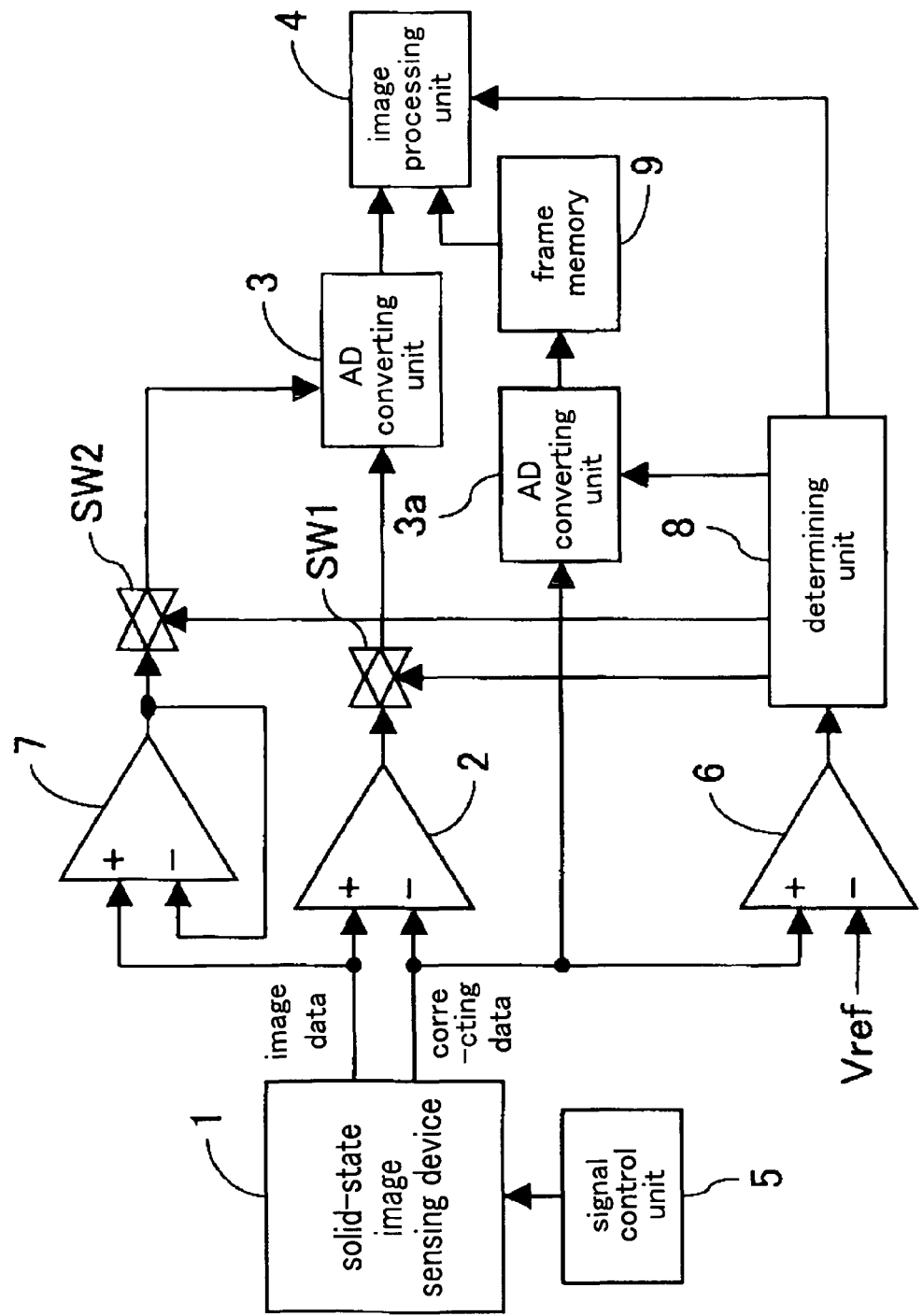
FIG. 13 is a block diagram showing an internal structure of the image sensing device of the fourth embodiment.

A fourth embodiment of the present invention will be explained with reference to drawings. FIG. 13 is a block diagram showing a structure of an image sensing device of the present embodiment. Here, in the image sensing device shown in FIG. 13, the similar parts in the image sensing device of FIG. 9 are designated by similar reference numerals, and detailed explanation thereof is omitted.

As shown in FIG. 13, the image sensing device of the present invention includes, in addition to the structure shown in FIG. 9, a buffer 7 configured to be input image data from a solid-state image sensing device 1, a determining unit 8 for determining whether or not a proper subtracting process is performed in a subtracter 2 according to a comparison result from a comparer 6, a frame memory 9 for storing correcting data of respective pixels G11 to Gmn of the solid-state image sensing device 1, an AD converting unit 3a for converting the correcting data from the solid-state image sensing device 1 to a digital data and output to the frame memory 9, a switch SW1 for electrically connecting and disconnecting an output side of the subtracter 2 to an input side of the AD converting unit 3, and a switch SW2 for electrically connecting and disconnecting an output side of the buffer 7 to an input side of the AD converting unit 3.

In the buffer 7, the image data from the solid-state image sensing device 1 is input to a noninverting input terminal and an inverting input terminal is connected with an output terminal. A control signal based on a determination result from the determining unit 9 is given to the AD converting unit 3a, an image processing unit 4, and the switches SW1 and SW2. Here, in the case that the structure of the pixels G11 to Gmn included in the solid-state image sensing device 1 is the same as that of the third embodiment which is shown in FIG. 10 and incident light emitted to the pixels is in high brightness, a black-and-white inversion phenomenon occurs.

The image sensing device having this type of structure, similar to the third embodiment, the value of the correcting data output from the solid-state image sensing device 1 is compared to a threshold Vref in the comparer 6. Here, in the case where the value of brightness of an object is equal to or lower than the brightness value Lth in which correcting data starts monotonically increasing, the value of correcting data input to the comparer 6 is smaller than the threshold value Vref and a signal in low level is output. The signal in low level is output from the comparer 6, the determining unit 8 confirms that the brightness value of the object is in the brightness range in which a black-and-white inversion phenomenon may not occur and that a proper subtracting process is performed in the subtracter 2.

A control signal is given from the determination unit 8 to the switches SW1 and SW2, and then, the switch SW1 is tuned on and the switch SW2 is turned off. A noise element of an image signal, which is caused by a sensitivity unevenness, is removed in the subtracter 2. The image signal is given to the image processing unit 4 via the switch SW1, and an image sensing process is performed. Here, the control signal from the determining unit 8 is also given to the AD converting unit 3a and the AD converting unit 3a operates so that the correcting data from the solid-state image sensing device 1 is converted into a digital signal and stored in the frame memory 9.

In a case that the brightness value of an object is higher than the brightness value Lth in which correcting data starts monotonically increasing, the value of the correcting data input to the comparer 6 is larger than the threshold value Vref and a signal in high level is output. The signal in high level is output from the comparer 6, the determining unit 8 confirms that the brightness value of the object is in the brightness range in which a black-and-white inversion phenomenon may occur and that a proper subtracting process is not performed in the subtracter 2.

A control signal is given to the switches SW1 and SW2, and then the switch SW1 is turned off and the switch SW2 is turned on. A noise element caused by the sensitivity unevenness from buffer 7 is overlapped to an image signal. The image signal is given to the image processing unit 4 via the switch SW2. That is, the image data output from the solid-state image sensing device 1 is output from the buffer 7 as an image signal and given to the image processing unit 4 via the switch SW2 and the AD converting unit 3.

As described above, when the image data of the respective pixels G11 to Gmn is given to the image processing unit 4 as the image signal from the buffer 7, in the image processing unit 4, the correcting data stored in the frame memory 9 is read and the correcting data is subtracted from the image data and noise element caused by the sensitivity unevenness is removed for each pixel. As a result, a noise-removed image data is generated. Various image processes are performed to the image signal whose noise element caused by sensitivity unevenness is removed. Here, the control signal from the determining unit 8 is also given to the AD converting unit 3a, and operations in AD converting unit 3a is inhibited so that the correcting data stored in the frame memory 9 is not updated.

According to the present embodiment, even in the high brightness range where a black-and-white inversion phenomenon occurs, image data which is sent via the buffer 7 and converted to a digital signal in the AD converting unit 3 is given to the image processing unit 4. Therefore, differently from the third embodiment, even in such brightness range, changes of tone can be expressed and preferable contrasts in high brightness can be obtained.

According to the fourth embodiment, the digital signal converted from correcting data output from the solid-state image sensing device 1 is stored and updated in the frame memory 9. However, the correcting data stored in the frame memory 9 may be updated at a predetermined timing, for example, of switching the operative condition of the solid-state image sensing device 1. Only the correcting data which is previously confirmed for each pixel that it is in the brightness range under the brightness value Lth may be stored in the frame memory 9 and the data may not be updated.

According to the first to fourth embodiments, as shown in FIG. 12, the threshold value Vref is set to a value in a range between where the value of the correcting data corresponding to brightness value is constant and where monotonically increasing is started, so that it may be determined whether or not it is in the range in which a black-and-white inversion occurs. Further, according to the third and fourth embodiments, in the comparer 6, the correcting data may be input to an inverting input terminal at the same time when a threshold value Vref is input to a noninverting input terminal.

According to the third and fourth embodiments, the image data and the correcting data output from the pixels G11 to Gmn are inverted and output from the solid-state image sensing device 1. However, the image data and the correcting data may be output from the solid-state image sensing device 1 without inverting. In this case, the correcting data may be input to the inverting input terminal of the subtracter 2 and the image data may be input to the noninverting input terminal so as to invert the data in the subtracter 2.

The structure of pixels of the first to fourth embodiments are explained to be circuitries shown in FIGS. 4, 6, and 10, however, it should not be limited to such circuitries. An integrating circuit may be added, or a simultaneous integrating function may be provided. Namely, as shown in FIG. 14, in addition to each pixel in the image sensing device of the first embodiment, an MOS transistor T6 whose gate is connected to the gate and drain of the MOS transistor T2, a capacitor C1 which has one end connected to the connecting node between a source of the MOS transistor T6 and the gate of the MOS transistor T3 and another end being applied a DC voltage VPS, and an MOS transistor T7 for resetting a voltage at the connecting node between the source of the MOS transistor T6 and one end of the capacitor C1.

Figure 15:
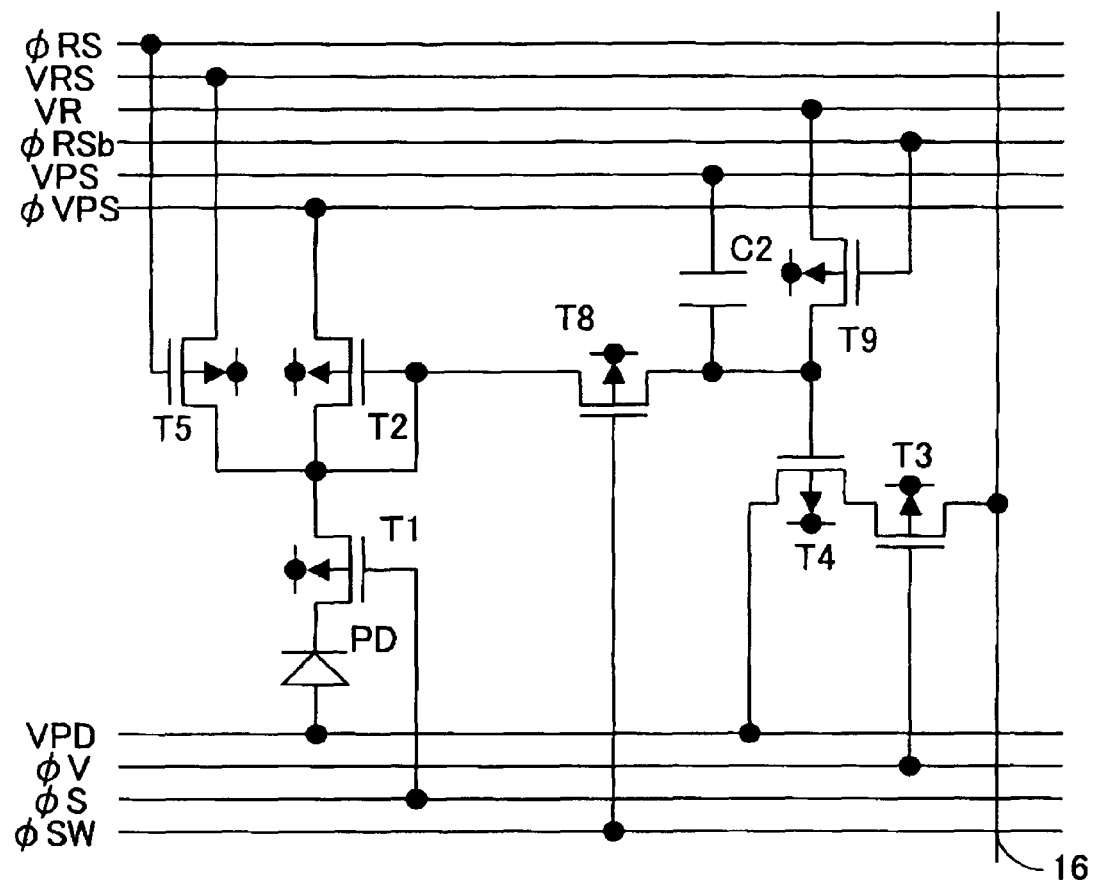
FIG. 15 is a circuit diagram showing another structure of the pixel provided to the solid-state image sensing device included in the image sensing device of the present invention.

As shown in FIG. 15, the structure of the each pixel in the image sensing device of the first embodiment may include, in addition to the structure shown in FIG. 4, an MOS transistor T8 whose drain is connected to the gate and drain of the MOS transistor T2, a capacitor C2 which has one end connected to a connecting node between a source of the MOS transistor T8 and the gate of the MOS transistor T4 and another end being applied a DC voltage VPS, and an MOS transistor T9 for resetting a voltage at the connecting node between the source of the MOS transistor T8 and one end of the capacitor C2. This structure may include a simultaneous integrating function for electrically connecting and disconnecting the photoelectric converting section and the output section in use of the MOS transistor T8.

Figure 14:
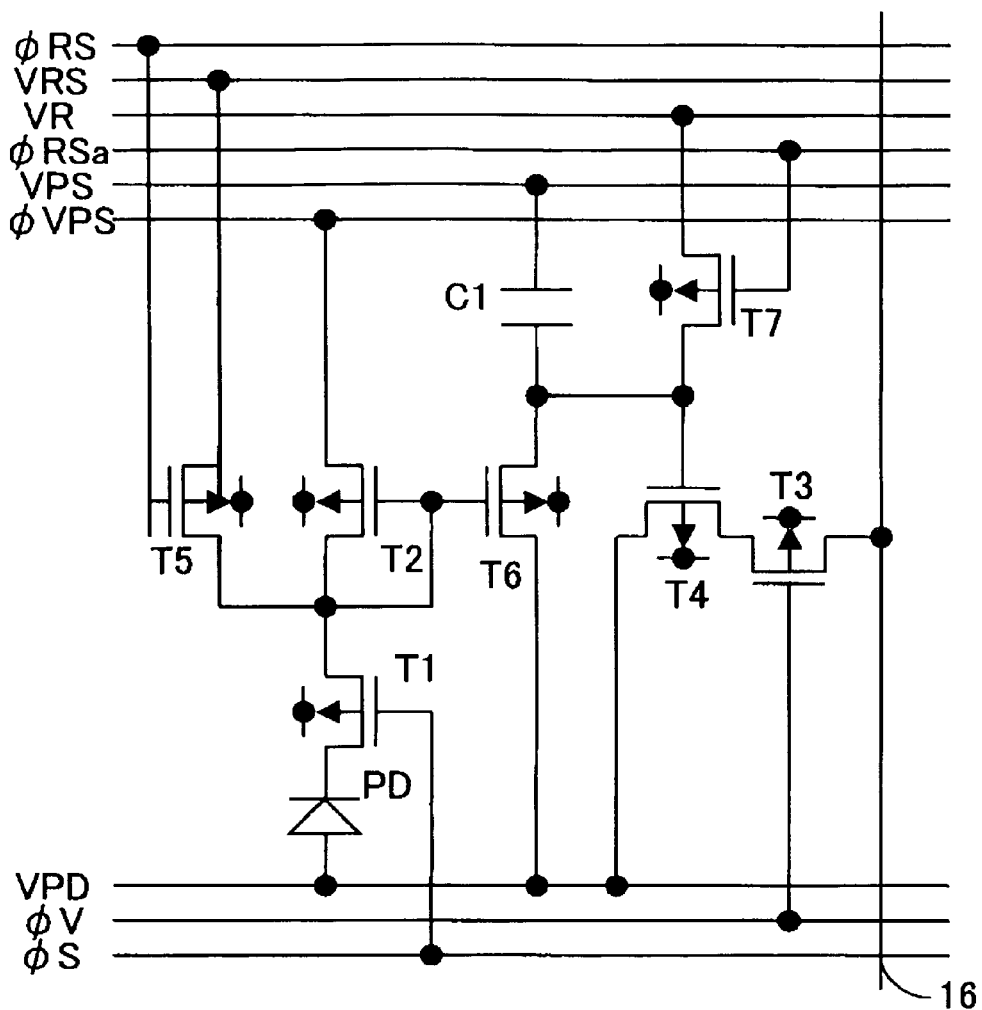
FIG. 14 is a circuit diagram showing another structure of the pixel provided to the solid-state image sensing device included in the image sensing device of the present invention.
Figure 16:
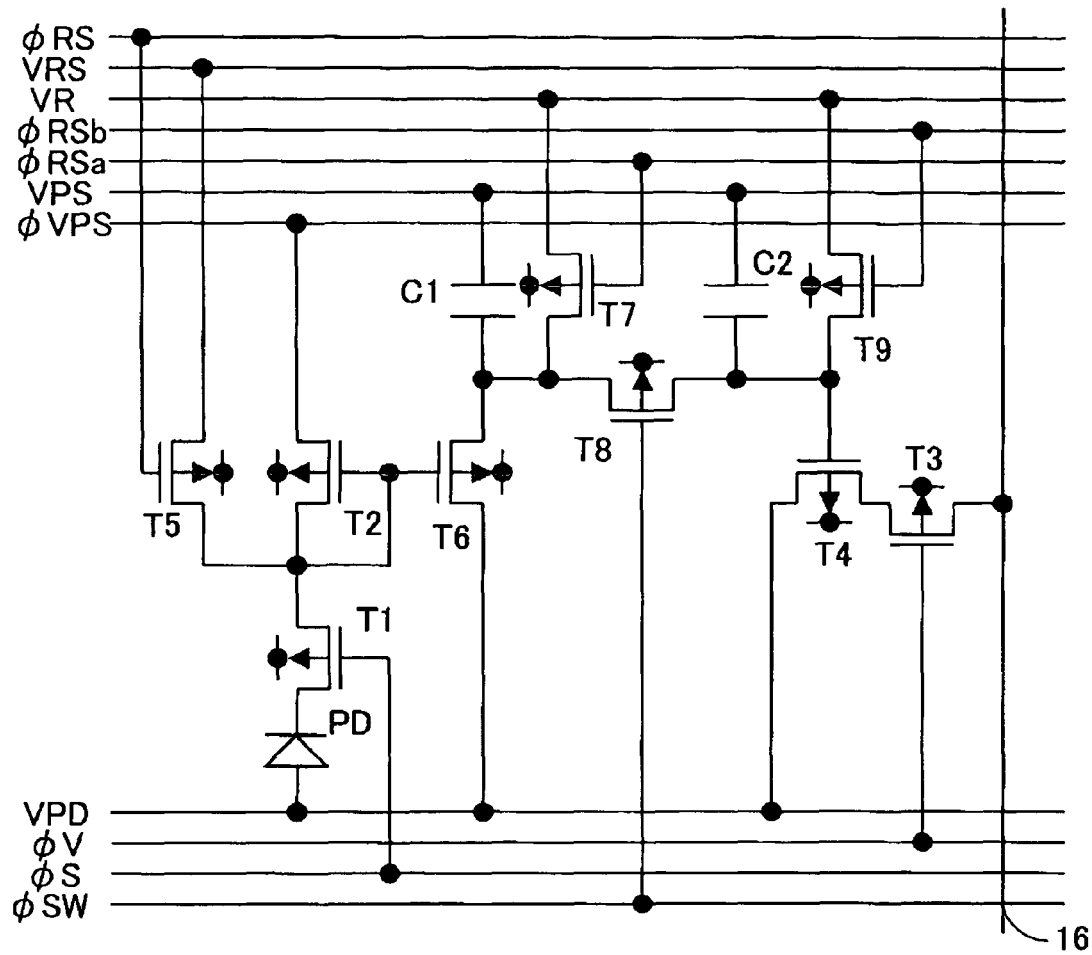
FIG. 16 is a circuit diagram showing another structure of the pixel provided to the solid-state image sensing device included in the image sensing device of the present invention.

As shown in FIG. 16, in the structure of the respective pixels in the image sensing device of the first embodiment, the drain of the MOS transistor T8 may be connected with the connection node between the source of the MOS transistor T6 and one end of the capacitor C1, by combining the structures of FIGS. 14 and 15, so as to add an integrating circuit to the photoelectric converting section and to provide a simultaneous integrating function. Further, structure of each pixel in the image sensing device of the first embodiment is used as an example for above explanation for providing an integrating circuit or a simultaneous integrating function. However, in structure of each pixel in the image sensing devices of the second to fourth embodiments, an integrating circuit or a simultaneous integrating function may be provided, similarly, by adding MOS transistors T6 to T9 and capacitors C1 and C2.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A solid-state image sensing device comprising:
   a signal control unit and
   a pixel, the pixel including:
      a photoelectric converting element for producing a photoelectric charge according to an amount of incident light,
      a first transistor adapted to connect to the photoelectric converting element and adapted to generate an electric signal according to the photoelectric charge from the photoelectric converting element,
      an output unit for outputting the electric signal from the first transistor,
      a switch located between the photoelectric converting element and the first transistor, and
      a reset voltage supplying unit connected to a node between the photoelectric converting element and the first transistor
   wherein the signal control unit is programmed:
      to cause the switch to electrically connect the photoelectric converting element and the first transistor during an image sensing operation and a first reset step,
      to cause the reset voltage supplying unit to supply a voltage substantially equal to a voltage value produced at a node between the photoelectric converting element and the switch when light having a higher brightness value than a photographable brightness range is incident on the photoelectric converting element to a node between the photoelectric converting element and the first transistor to inject an electric charge into the photoelectric converting element and the first transistor during the first reset step after an image reading operation is completed, to cause the switch to electrically disconnect the photoelectric converting element and the first transistor to reset an operative condition of the first transistor during a second reset step, and to cause the switch to electrically connect the photoelectric converting element and the first transistor to reset a remaining electric charge in the photoelectric converting element during a third reset step.

2. A solid-state image sensing device according to claim 1, wherein the reset voltage supplying unit includes a first electrode configured to have applied a predetermined voltage and a second electrode configured to be connected with a node between the photoelectric converting element and the first transistor, and wherein the reset voltage supplying unit is a second transistor configured to be turned on and off in a predetermined timing.

3. A solid-state image sensing device according to claim 1, wherein the image reading operation includes outputting from the output unit an electric data to be used as screen image data obtained by an image sensing operation performed by the photoelectric converting element and the first transistor.

4. An image sensing device including a solid-state image sensing device for outputting an electric signal obtained in an image sensing operation as image data and outputting an electric signal obtained after a reset operation as correcting data, and a subtracter for outputting a value obtained by subtracting the image data and the correcting data from the solid-state image sensing device, wherein the solid-state image sensing device is the solid-state image sensing device claimed in claim 1.

5. An image sensing device including a solid-state image sensing device for outputting an electric signal obtained in an image sensing operation as image data and outputting an electric signal obtained after resetting as correcting data, a subtracter for outputting image signal obtained by subtracting the image data and the correcting data from the solid-state image sensing device, and a signal processing unit for performing signal processing on the image signal from the subtracter, comprising:

the solid-state image sensing device which is the solid-state image sensing device claimed in claim 1, a comparator for comparing the correcting data output from the solid-state image sensing device with a reference value, and a determining unit for determining whether or not to select the image signal from the subtracter as image data for signal processing according to a comparison result in the comparator.

6. An image sensing device according to claim 5, wherein, in a case that the determining unit confirms that a value of the correcting data is in a brightness range which is substantially changed from a brightness value according to the comparison result in the comparator, not an image signal from the subtracter but an image signal set in a value based on a highest brightness value is selected as an image signal for the signal processing.

7. An image sensing device according to claim 5, comprising:

a memory for previously storing the correcting data, wherein, in a case that the determining unit confirms that a value of the correcting data is in a brightness range which is substantially changed from a brightness value according to the comparison result in the comparator, not an image signal from the subtracter but an image signal obtained by subtracting the image data output from the solid-state image sensing device and the correcting data stored in the memory is selected as an image signal for the signal processing.

8. An image sensing device according to claim 7, wherein the correcting data stored in the memory is a correcting data stored in a condition that a value of the correcting data is in a brightness range which is approximately constant to brightness value, according to the comparison result in the comparator.

9. A method of resetting a solid-state image sensing device having a pixel, the pixel including a photoelectric converting element and a first transistor, the method comprising the steps of:

performing an image data reading operation to output electric data to be used as image data obtained by an image sensing operation performed by the photoelectric converting element and the first transistor while the photoelectric converting element and the first transistor are electrically connected;

supplying a voltage substantially equal to a voltage value which is produced in a node between the photoelectric converting element and the first transistor when light having a higher brightness value than a photographable brightness range is emitted to the photoelectric converting element to a node between the photoelectric converting element and the first transistor after the image data reading operation to inject an electric charge into the photoelectric converting element and the first transistor;

electrically disconnecting the photoelectric converting element and the first transistor to reset an operative condition of the first transistor; and electrically connecting the photoelectric converting element and the first transistor to reset a remaining electric charge in the photoelectric converting element.

10. A method according to claim 9, wherein the pixel includes a switch for electrically connecting and disconnecting the photoelectric converting element and the first transistor, wherein when the pixel performs an image sensing operation, the switch is turned on to connect the photoelectric converting element and the first transistor, and wherein when the pixel performs a reset operation, the switch is turned off to disconnect the photoelectric converting element and the first transistor to reset an operative condition of the first transistor, and the switch is turned on to connect the photoelectric converting element and the first transistor to reset remained electric charge in the photoelectric converting element.

11. A pixel for use in a solid-state image sensing device, the pixel comprising:

a photoelectric converting element that produces a photoelectric charge according to an amount of incident light, a first transistor connected to the photoelectric converting element that generates an electric signal according to the photoelectric charge from the photoelectric converting element, an output unit that outputs the electric signal from the first transistor, a reset voltage supplying unit that supplies a voltage substantially equal to a voltage value produced in a node between the photoelectric converting element and the first transistor when light having a higher brightness value than a photographable brightness range is incident on the photoelectric converting element to a node between the photoelectric converting element and the first transistor during a first reset step to inject electric charge into the photoelectric converting element and the first transistor after an image data reading operation, and a switch that electrically connects the photoelectric converting element and the first transistor during an image sensing operation and the first reset step, and electrically disconnects the photoelectric converting element and the first transistor to reset an operative condition of the first transistor and electrically connects the photoelectric converting element and the first transistor to reset a remaining electric charge in the photoelectric converting element during a second reset step.

12. An image sensing device including a solid-state image sensing device that outputs an electric signal obtained in an image sensing operation as image data and output an electric signal obtained after a reset operation as correcting data, and a subtracter that outputs a value obtained by subtracting the correcting data from the image data, wherein the solid-state image sensing device includes a pixel as claimed in claim 11.

13. The image sensing device according to claim 12, further comprising:

a signal processing unit adapted to perform signal processing on the value outputted from the subtracter;

a comparator adapted to compare the correcting data output from the solid-state image sensing device with a reference value, and a determining unit adapted to determine whether or not to select the value outputted from the subtracter as an image signal for signal processing according to a comparison result in the comparator.

14. The image sensing device according to claim 13, wherein the image sensing device is adapted to set the image signal for signal processing to a value based on a highest brightness value when the determining unit confirms that a value of the correcting data is in a brightness range which is substantially changed from a brightness value according to the comparison result in the comparator.

15. A method of resetting a pixel in a solid-state image sensing device, the pixel including a photoelectric converting element and a first transistor, the method comprising the steps of:

performing an image data reading operation to output electric data to be used as image data obtained by an image sensing operation performed by the photoelectric converting element and the first transistor while the photoelectric converting element is electrically connected to the first transistor;

supplying a voltage substantially equal to a voltage value produced in a node between the photoelectric converting element and the first transistor when light having a higher brightness value than a photographable brightness range is incident on the photoelectric converting element to a node between the photoelectric converting element and the first transistor after the image data reading operation to inject an electric charge into the photoelectric converting element and the first transistor;

electrically disconnecting the photoelectric converting element and the first transistor to reset an operative condition of the first transistor; and electrically connecting the photoelectric converting element and the first transistor to reset a remaining electric charge in the photoelectric converting element.

* * * * *